(12) United States Patent
Aoyagi et al.

(10) Patent No.: US 9,791,093 B2
(45) Date of Patent: Oct. 17, 2017

(54) LOAD SUPPORT MECHANISM

(71) Applicants: Tatsuzo Aoyagi, Yamanashi-ken (JP);
Hiroto Akiyama, Yamanashi-ken (JP);
Toru Ochiai, Yamanashi-ken (JP);
Misao Kobayashi, Yamanashi-ken (JP)

(72) Inventors: Tatsuzo Aoyagi, Yamanashi-ken (JP);
Hiroto Akiyama, Yamanashi-ken (JP);
Toru Ochiai, Yamanashi-ken (JP);
Misao Kobayashi, Yamanashi-ken (JP)

(73) Assignee: CANON FINETECH NISCA INC.,
Misato-Shi, Saitama (JP)

( * ) Notice: Subject to any disclaimer, the term of this patent is extended or adjusted under 35 U.S.C. 154(b) by 166 days.

(21) Appl. No.: 14/511,895

(22) Filed: Oct. 10, 2014

(65) Prior Publication Data
US 2015/0102200 A1  Apr. 16, 2015

(30) Foreign Application Priority Data

Oct. 11, 2013 (JP) .................................. 2013-214255
Oct. 11, 2013 (JP) .................................. 2013-214257
Mar. 12, 2014 (JP) .................................. 2014-049397

(51) Int. Cl.
*F16M 11/04* (2006.01)
*F16M 11/42* (2006.01)
(Continued)

(52) U.S. Cl.
CPC ............ *F16M 11/046* (2013.01); *F16D 59/02* (2013.01); *F16D 63/008* (2013.01); *F16M 11/42* (2013.01);
(Continued)

(58) Field of Classification Search
CPC ........ A61B 2090/504; A61B 2090/508; A61B 90/60; A47C 7/54; A47C 7/543;
(Continued)

(56) References Cited

U.S. PATENT DOCUMENTS 3,588,010 A * 6/1971 Liesegang ............. F16L 3/2056
248/542
4,613,119 A * 9/1986 Hardtke ................ F16L 3/2056
248/613
(Continued)

FOREIGN PATENT DOCUMENTS

JP 2002-215055 A 7/2002
JP 2002-303304 A 10/2002

*Primary Examiner* — Nkeisha Smith
(74) *Attorney, Agent, or Firm* — Manabu Kanesaka

(57) ABSTRACT

To realize a mechanism that can support an article at a desired position in such a way as to be able to move the article, with a thin, simple configuration.

A load support mechanism 1 includes a fixed support section 2, which includes a fixed cam 8; a movable support section 3, which receives a load and can move vertically; a horizontal cam groove 13, which is provided in the movable support section; a cam follower member 15, which can move horizontally along the cam groove; a first spring 4, which is mounted between the fixed support section and the movable support section to support a load; and a second spring 18, which pushes the cam follower member horizontally and presses the cam follower member against a fixed cam surface 9 of the fixed cam. A reaction force of the fixed cam against the cam follower contains a vertical component depending on a height position of the movable support section, and the vertical component assists or reduces the spring's force to push up the load. A cam shape of the fixed cam surface is provided in such a way that the load acting around the cam follower, the spring forces of the first and second springs, and the reaction force applied from the fixed cam are balanced against each other.

7 Claims, 25 Drawing Sheets

(51) Int. Cl.
*F16D 59/02* (2006.01)
*F16D 63/00* (2006.01)
*F16M 11/18* (2006.01)

(52) U.S. Cl.
CPC ....... *F16M 11/18* (2013.01); *F16M 2200/027* (2013.01); *F16M 2200/047* (2013.01)

(58) Field of Classification Search
CPC .... F16M 13/022; F16M 11/046; F16M 11/18; F16M 11/04; F16M 11/24; F16M 11/42; G03B 21/56
USPC .......................... 248/118, 158, 161, 157, 420
See application file for complete search history.

(56) References Cited

U.S. PATENT DOCUMENTS

| | | | | |
|---|---|---|---|---|
| 5,018,700 A * | 5/1991 | Hardtke | ................ | F16L 3/217 248/571 |
| 5,246,191 A * | 9/1993 | Moss | ................ | A47B 21/0371 248/118.3 |
| 6,026,755 A * | 2/2000 | Long | ................ | A47B 9/02 108/147 |
| 6,189,849 B1 * | 2/2001 | Sweere | ................ | A47B 21/0314 248/286.1 |
| 6,227,518 B1 * | 5/2001 | Sun | ................ | F16M 11/10 248/371 |
| 6,994,306 B1 * | 2/2006 | Sweere | ................ | F16M 11/10 248/295.11 |
| 6,997,422 B2 * | 2/2006 | Sweere | ................ | F16M 11/04 248/123.11 |
| 7,032,870 B2 * | 4/2006 | Sweere | ................ | F16M 11/10 248/295.11 |
| 7,506,853 B2 * | 3/2009 | Sweere | ................ | F16M 11/10 248/295.11 |
| 7,971,846 B2 * | 7/2011 | Hardtke | ................ | F16L 3/2056 248/542 |
| 8,152,144 B2 * | 4/2012 | Wisse | ................ | F16M 11/04 267/136 |
| 8,251,338 B2 * | 8/2012 | Hardtke | ................ | F16L 3/21 248/542 |
| 8,313,074 B2 * | 11/2012 | Wang | ................ | F16M 11/04 248/157 |
| 8,405,959 B2 * | 3/2013 | Lee | ................ | F16M 11/04 248/125.2 |
| 9,169,960 B2 * | 10/2015 | Hakansson | ................ | F16M 11/18 |
| 2005/0145762 A1 * | 7/2005 | Sweere | ................ | F16M 11/10 248/157 |
| 2007/0102600 A1 * | 5/2007 | Ishizaki | ................ | F16M 11/24 248/176.3 |
| 2013/0168335 A1 * | 7/2013 | Gillespie | ................ | F16M 11/041 211/26 |
| 2015/0001355 A1 * | 1/2015 | Huang | ................ | F16M 11/046 248/123.11 |
| 2015/0076311 A1 * | 3/2015 | Hakansson | ................ | F16M 11/18 248/422 |

\* cited by examiner

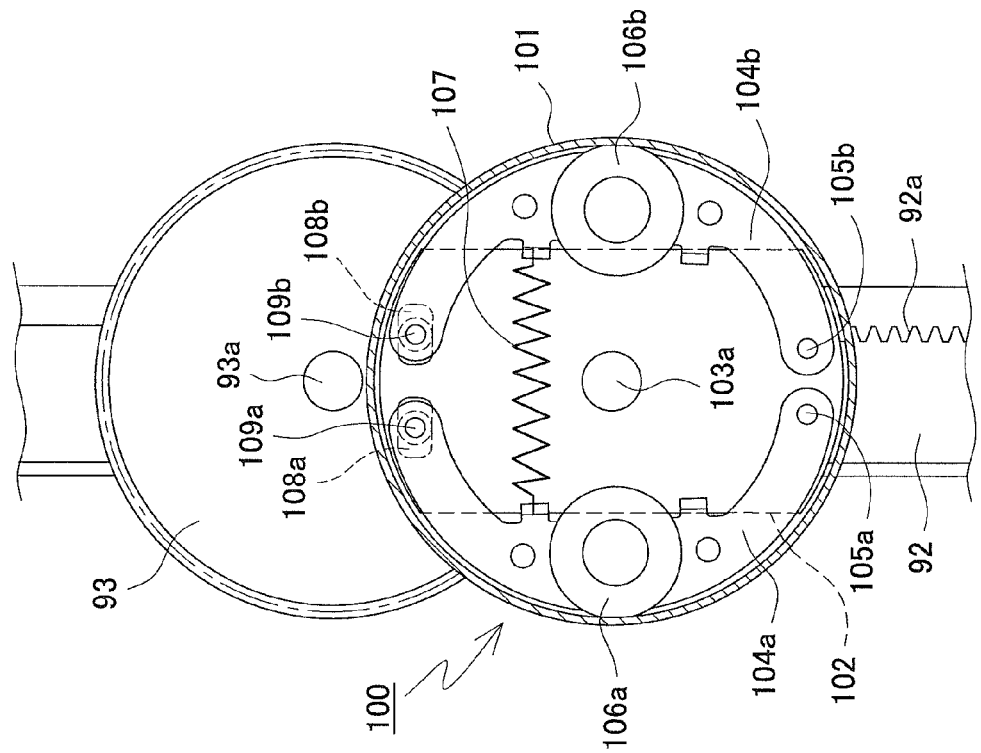
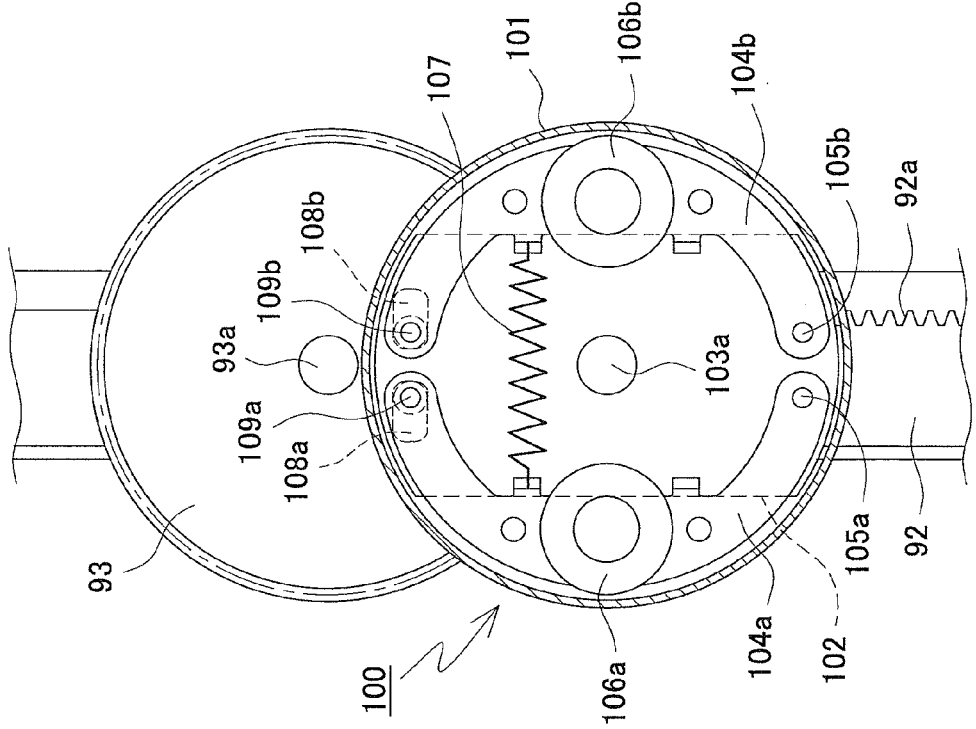

LOAD SUPPORT MECHANISM

BACKGROUND OF THE INVENTION

Technical Field

The present invention relates to a support mechanism for supporting various articles or any other kind of load, and particularly to a load support mechanism for supporting a target article at a desired position in such a way as to able to move the article.

Description of the Related Art

Conventionally, various support mechanisms are proposed to support an article, such as a computer, a television monitor device, a top table of an OA desk or work table, or a heavy object, at a desired height position in such a way as to be able to move the article up and down. For example, what is known is a monitor device support mechanism that can move the monitor device up and down and position the monitor device with a constant support force (Such a mechanism is disclosed in Jpn. Pat. Appln. Laid-Open Publication No. 2002-215055 and Jpn. Pat. Appln. Laid-Open Publication No. 2002-303304, for example).

The monitor device support mechanism disclosed in Jpn. Pat. Appln. Laid-Open Publication No. 2002-215055 includes at least one cam; at least one cam follower member; an energy storage member, such as a spring; a moving body, on which a monitor device is mounted; and an arm member, which connects the cam follower member to the moving body and which can freely swing. In the monitor device support mechanism, as the moving body moves along a fixed base, the spring is compressed or stretched by the cam. The spring force of the spring is transformed by a surface of the cam into a reaction force against the cam follower member. A first reaction force component that is part of the reaction force and is applied in a movement direction of the moving body generates a support force for the moving body and the monitor device, via the arm member.

According to Jpn. Pat. Appln. Laid-Open Publication No. 2002-215055, the shape of the cam is designed in such a way to keep a constant level of the first reaction force component in the movement direction. The combination of such a spring and the shape of the cam keeps an almost constant level of the force that presses the moving body, which is moving, and the monitor in the movement direction. Therefore, when a slight force is manually applied to the moving body or the monitor device, the monitor device can be easily moved. When the force is released, the moving body and the monitor device stop at a new support position thereof. What is also disclosed in Jpn. Pat. Appln. Laid-Open Publication No. 2002-215055 is an adjustment mechanism that adjusts a variable load on the monitor device support mechanism by rotating cams around shafts and thereby adjusting the distance between the cams.

What is disclosed in Jpn. Pat. Appln. Laid-Open Publication No. 2002-303304 is another force adjustment mechanism that adjusts an almost constant level of a support force similarly applied to a moving body and a monitor device. The force adjustment mechanism is designed to support various weights of load in a monitor device support mechanism by changing the effective length and pre-tension of a plate spring that presses a cam follower (roller) against a guide surface of a cam.

In order to support a load, such as a conduit, with a roughly constant level of spring biasing force, a suspension device is known (Refer to U.S. Pat. No. 4,613,119, for example): the suspension device includes a main spring mechanism, which supports a load in a suspended manner, and an additional spring mechanism, which compensates for a change in the biasing force of the main spring mechanism. The main spring mechanism includes an up-down-direction main spring, which is mounted between an upper head member that is fitted onto a vertical sleeve and fixed to an upper end of the sleeve and a lower spring bearing that is fixed to a casing. By the upward biasing force of the main spring, a downward load that acts on a lower end of the sleeve is supported.

In the additional spring mechanism, a pair of cam followers, which are provided on the head member, a pair of cam arms, which are attached to the casing in such a way as to freely swing, a pair of cam surfaces, which are formed integrally with the cam arms, and a pair of additional springs, which horizontally press the cam arms to press the cam surfaces against the cam followers, are disposed symmetrically in the left-right direction. The cam follower roll along the curved cam surface in such a way as to offset an up-down-direction movement of the sleeve caused by the load as a change in the biasing force of the main spring caused by the up-down-direction movement is offset by the biasing force of the additional spring.

SUMMARY OF THE INVENTION

From a practical point of view, it is preferred that this type of article support mechanism be small and light with a simple configuration and a fewer number of components. In addition, especially when a monitor device, such as a television set that is often disposed along a wall surface, is supported, the support mechanism itself is required to be thinner, or smaller in depth, as the monitor device becomes thinner.

However, in the monitor device support mechanism disclosed in Jpn. Pat. Appln. Laid-Open Publication No. 2002-215055 or 2002-303304, the coil spring, which serves as an energy storage member, is disposed in such a way that an axis direction thereof extends in a direction substantially perpendicular to the movement direction of the monitor device; and the moving body and the monitor device are supported only by the force of that spring. Moreover, the force of supporting the moving body and the monitor device is generated only by the first reaction force component applied in the movement direction of the moving body, not all the reaction force of the cam surface applied to the cam follower member.

Therefore, as an energy storage member, a large coil spring that exerts a far larger spring force than the weight of the moving body and monitor device supported is required. Moreover, this coil spring is disposed on the front and/or rear side of the cam. Furthermore, the support force for the moving body is transmitted from the cam follower member via the swingable arm member. Therefore, in order to support a large, heavy monitor device, for example, as described in Jpn. Pat. Appln. Laid-Open Publication No. 2002-215055, FIG. 4A of Jpn. Pat. Appln. Laid-Open Publication No. 2002-303304 and the like, a thick, sturdy and large arm member needs to be used. As a result, in the case of the monitor device support mechanisms of Jpn. Pat. Appln. Laid-Open Publication No. 2002-215055 and 2002-303304, since the device as a whole becomes larger especially in the depth direction, it is difficult to make the mechanism thinner. Moreover, it is not easy to make the device smaller and lighter because the configuration thereof is complicated.

Furthermore, in the case of the monitor device support mechanisms of Jpn. Pat. Appln. Laid-Open Publication Nos.

2002-215055 and 2002-303304, the force of supporting the moving body and the monitor device is determined only by the combination of the spring, which presses the cam follower member, and the shape of the cam. Therefore, the force adjustment mechanism disclosed in those documents may not be able to adequately cope with a major change in the weight of the monitor device. As a result, in order to support a monitor device whose weight is vastly different, it may need to replace the spring and the cam, or the support mechanism itself. In this case, for each of to-be-supported target articles of different weights, different support mechanisms or components need to be prepared, leading to higher prices.

The suspension device disclosed in U.S. Pat. No. 4,613,119 is just a cushioning mechanism for stabilizing and supporting a conduit at a predetermined constant height position. Therefore, the suspension device cannot move the conduit or the like to a desired height position and support the conduit or the like at the height position in a stationary state.

Moreover, as recent monitor devices are becoming heavier due to the screens that are made even larger, the article support mechanism is increasingly required to withstand a heavier load.

The present invention has been made in view of the above problems. The object of the present invention is to provide a load support mechanism that can support a load, such as an article, in a stationary state in such a way as to be able to move the load and which can be easily made smaller and thinner, or especially smaller in depth, with a relatively simple configuration and a fewer number of components.

Besides the above object, another object of the present invention is to provide a load support mechanism that is strong enough to withstand a heavy load.

A load support mechanism of the present invention includes:

a fixed support section;

a movable support section that can move in a predetermined direction relative to the fixed support section within a predetermined range and is used to receive a load;

a fixed cam that is provided in the fixed support section and includes a fixed cam surface;

a cam groove that is provided in the movable support section, includes a first and a second movable cam surface that face each other, and extends in a direction that crosses a movement direction of the movable support section;

a cam follower that can move in the cam groove along the cam groove while being in contact with the first or second movable cam surface;

a first spring that is mounted between the fixed support section and the movable support section to support the load; and a second spring that presses the cam follower against the fixed cam surface, wherein a reaction force of the fixed cam surface against the cam follower contains a first-direction component, which is generated at a position thereof in the predetermined range in which the movable support section can move and which is applied in the movement direction of the movable support section, and a second-direction component, the direction of which is perpendicular to at least the movement direction of the movable support section, and the fixed cam surface has a cam shape by which the load acting around the cam follower, a biasing force of the first spring, a reaction force of the fixed cam surface against the cam follower, and a biasing force of the second spring are balanced in the predetermined range in which the movable support section can move.

In this configuration, when the forces acting around the cam follower are in an equilibrium state, the load, the biasing force of the first spring, and the first-direction component of the reaction force of the fixed cam surface are balanced against each other in the movement direction of the movable support section. Therefore, the movable support section can keep supporting a load at a desired position without using other components or an external force.

Here, throughout this specification, the term "equilibrium" means that, when several external forces are applied to a certain object or member (e.g., cam follower), the sum of those forces is zero, and that the object or the member therefore remains stationary. The external forces that are applied to that certain object or member include the load of that certain object or member itself, or its own weight; a frictional force that is generated between that certain object or member and another object or member; a frictional force or resistance that is generated on another object or member that exerts the external force on that certain object or member. In actual use, the frictional forces and the like can serve as forces to keep that certain object or member at the stationary position, when the weight of that certain object or member and the weight of another object or member are included among the above forces applied to the periphery of the cam follower and when the frictional forces and the like are equal to or larger than the sum of those forces.

Between the movable support section, which supports the load and moves, and the fixed support section, which includes the fixed cam, only the first spring and the cam follower exist. The difference between the load and the spring force of the first spring is directly transmitted, between both, from the cam groove of the movable support section via the cam follower. Therefore, the biasing force of the second spring is effectively used to support the load. Moreover, it is possible to realize a high level of structural strength with a fewer number of components and a small, simple configuration.

The biasing force of the first spring varies according to the amount of displacement thereof. Therefore, the biasing force becomes smaller or larger than or equal to the load, depending on the position of the movable support section. According to the present invention, when the forces are in an equilibrium state in the movement direction of the movable support section, and when the biasing force of the first spring is smaller than the load, the first-direction component of the reaction force of the fixed cam surface acts in a direction in which the biasing force of the first spring is assisted. When the biasing force of the first spring is larger than the load, the first-direction component of the reaction force of the fixed cam surface acts in a direction in which the biasing force of the first spring is reduced. Therefore, while supporting the load, the movable support section can keep the load at a desired position in a predetermined movable range thereof and easily move the load with a small force.

According to a certain embodiment, the load support mechanism includes a plurality of support mechanisms, each of which includes the fixed support section, the movable support section, the first spring, the second spring, the cam follower, the fixed cam, and the cam groove, wherein the fixed support section and the movable support section are shared by the plurality of support mechanisms. Accordingly, the burden of the load is spread among the plurality of support mechanisms. As a result, a larger load and a heavier article can be easily supported in a well-balanced manner.

Moreover, since the fixed support section and the movable support section are shared, the load can be borne by a larger area. Therefore, an even longer article or the like can be supported.

According to another embodiment, the load support mechanism includes a first and a second support mechanism, each of which includes the fixed support section, the movable support section, the first spring, the second spring, the cam follower, the fixed cam, and the cam groove, wherein the fixed support section, the movable support section, and the second spring are shared by the first and second support mechanisms, and the first and second support mechanisms are disposed symmetrically in a left-right direction with respect to the movement direction of the movable support section. Therefore, an even larger load can be supported by the first and second support mechanisms in a well-balanced manner in the left-right direction, and the movable support section can be held at a desired stationary position in a more stable manner and can be moved.

According to another embodiment, the fixed support section includes outer frame portions on both sides of the movement direction of the movable support section, and both side portions of the movable support section are guided by the outer frame portions in the movement direction. In this manner, both side portions of the movable support section are guided by the outer frame portions of the fixed support section. Therefore, since the outer frame portions are supporting, the structural strength of the movable support section and the entire load support mechanism can be improved.

According to another embodiment, the movable support section includes a support member that extends in a direction perpendicular to the movement direction thereof; the cam groove is provided on the support member; and the second spring is a compression coil spring that is fitted onto or into the support member to press the cam follower in a direction in which the support member extends. In this manner, the second spring is supported by the support member, which is part of the movable support section, and a possible buckling of the second spring, which can be caused by the compression and displacement thereof, is prevented without providing any additional member; the configuration of the entire device can be further simplified with a fewer number of components.

According to another embodiment, the cam groove extends from around one end of the support member to an opposite side, and the second spring is provided in such a way as to press the cam follower toward the one end of the support member. Therefore, a range in which the cam follower can be moved while being in contact with the fixed cam surface can be set larger. As a result, a fluctuation range of the biasing force of the second spring can be made larger, and a fluctuation range of the reaction force of the fixed cam and a fluctuation range of the first-direction component thereof, too, can be made larger. Accordingly, while maintaining the forces' equilibrium state, it is possible to enlarge the range in which the movable support section can be moved.

According to still another embodiment, the cam follower includes a first cam follower member, which passes through the cam groove in a front-back direction of the spring support member, and a pair of front and rear second cam follower members, which are provided at front and rear ends of the first cam follower member protruding from the cam groove; and the fixed cam includes a pair of front and rear fixed cam members with which each of the second cam follower members comes in contact. Therefore, the force applied from the fixed cam to the cam follower is spread along an axis direction of the first cam follower member in a well-balanced manner in the front-back direction, and the cam follower is kept in the cam grove in a stable manner. Therefore, such a configuration is favorable.

Furthermore, between the spring support member and the front and rear fixed cam members, another component does not exist. Therefore, an axis-direction length of the first cam follower member can be shortened. This configuration eliminates the risk of being excessively bent, deformed, or broken by the reaction force applied from the fixed cam member. As for the fixed cam, since the force applied from the cam follower is spread, the burden on each fixed cam member becomes smaller. Therefore, the fixed cam members can be made thinner. In this manner, the axis-direction length of the first cam follower member is shortened, and the fixed cam members are made thinner. As a result, the entire device can be made thinner and lighter.

According to another embodiment, the first and second springs are disposed in such a way as to at least partially overlap with each other when viewed in a direction perpendicular to the movement direction of the movable support section in a planar fashion. According to such an arrangement, the depth of the load support mechanism can be made smaller, and the thinner load support mechanism therefore can be designed.

BRIEF DESCRIPTION OF THE DRAWINGS

FIGS. 24A and 24B are partially crushed enlarged front views of a centrifugal brake mechanism when the mechanism is not operated and is operated.

DETAILED DESCRIPTION

With reference to the accompanying drawings, preferred embodiments of the present invention will be described in detail. Incidentally, in the accompanying drawings, similar components throughout this specification are represented by the same reference symbols.

Figure 1:
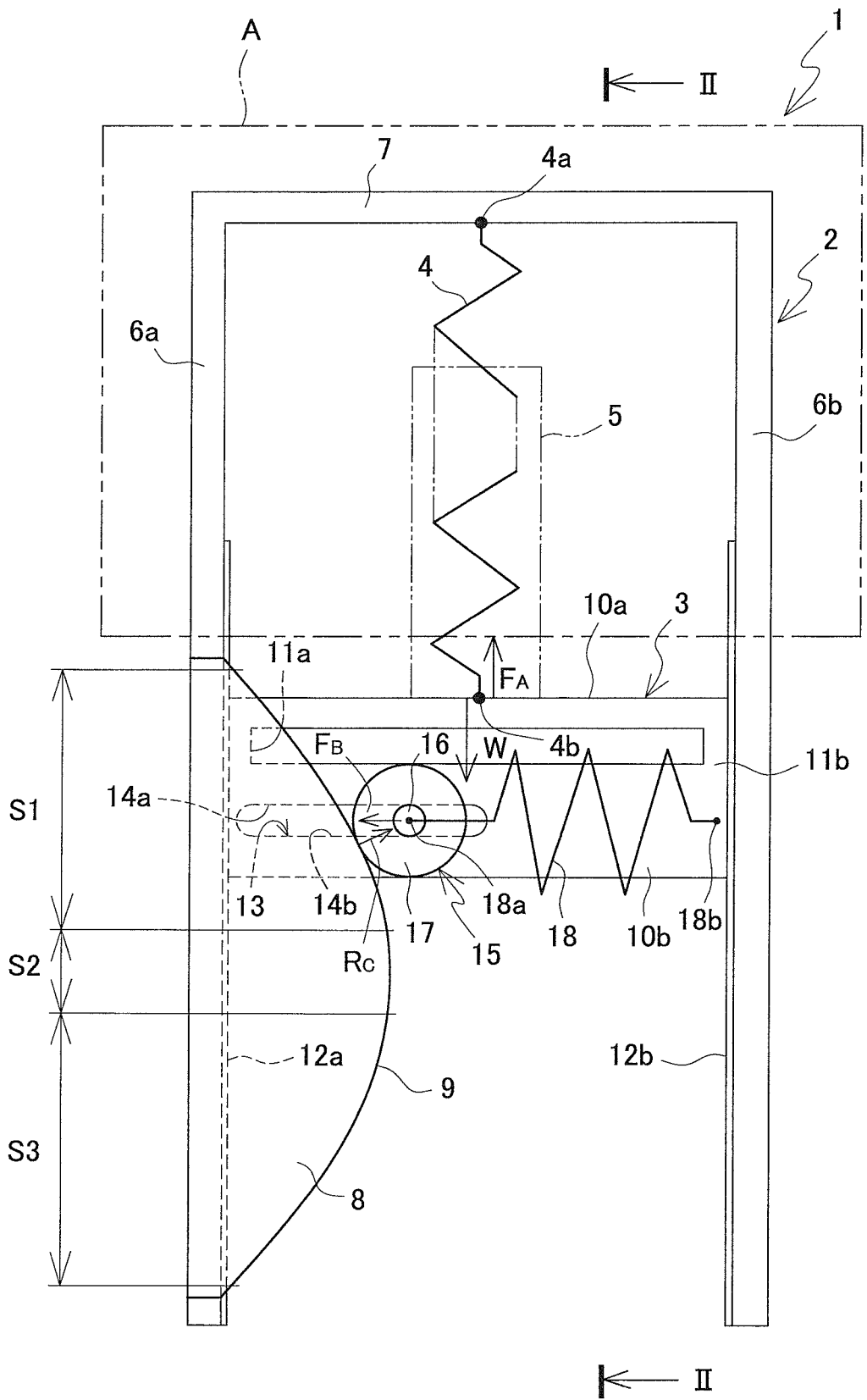
FIG. 1 is a front view showing the basic configuration of a load support mechanism according to the present invention.
Figure 2:
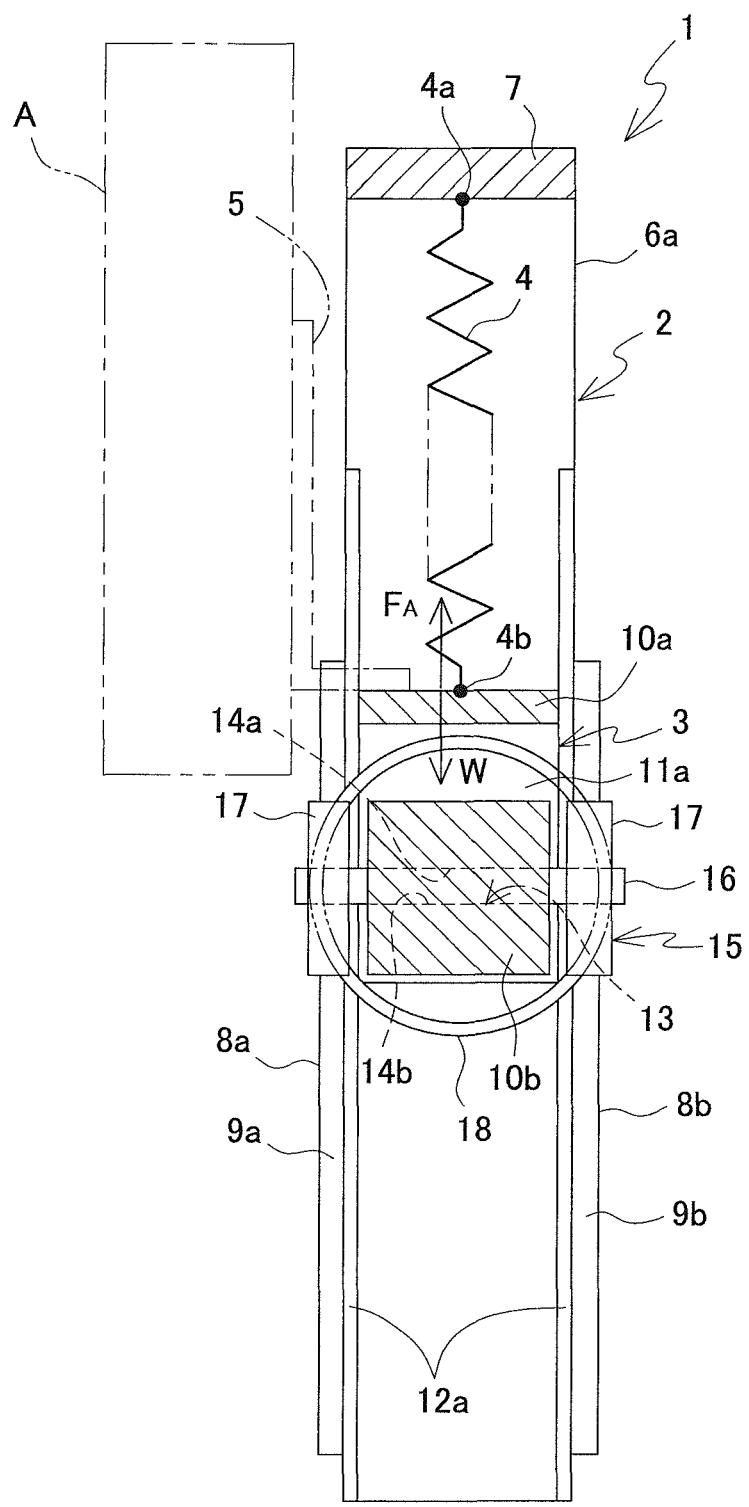
FIG. 2 is a view as seen in the direction of arrow along line II-II of FIG. 1.

FIGS. 1 and 2 conceptually show the basic configuration of a load support mechanism according to the present invention. As shown in the diagrams, a load support mechanism 1 includes a fixed support section 2, which is for example installed on a floor or a table; a movable support section 3, which receives a load of an article; and a first spring 4, which is for example an extension coil spring. For example, a television monitor device, or article A, can be supported by a mounting stay 5, which is provided on the movable support section 3, as the article A is attached to a front side of the load support mechanism 1.

According to the present embodiment, the fixed support section 2 has an outer frame structure, including left and right vertical frame members 6a and 6b, which extend vertically, and a lateral frame member 7, which is provided horizontally between upper ends of the two vertical frame members. On one vertical frame member 6a, a fixed cam 8, which extends from around an up-down-direction central position thereof to around a lower end, is provided integrally.

The fixed cam 8 includes a fixed cam surface 9: The fixed cam surface 9 is convex toward the right side of FIG. 1, or toward the other vertical frame member 6b, and the fixed cam surface 9 is curved in such a way that the slope of the tangent direction thereof is changed across the entire length from the upper end to the lower end or is changed partially. As shown in FIG. 2, one pair of fixed cams (8a, 8b) and fixed cam surfaces (9a, 9b) is preferably provided in a front side portion of the vertical frame member 6a, and another pair in a rear side portion of the vertical frame member 6a, in such a way as to be symmetric in the front-back direction.

According to the present embodiment, the movable support section 3 has a rectangular frame structure, including upper and lower lateral frame members 10a and 10b, which horizontally extend between the vertical frame members 6a and 6b of the fixed support section 2, and left and right vertical frame members 11a and 11b, which extend vertically. The vertical frame members 11a and 11b are provided in such a way as to be able to move up and down along inner-side guides 12a and 12b of the vertical frame members 6a and 6b of the fixed support section 2. After the article A is placed on the movable support section 3, the movable support section 3 can move in the up-down direction relative to the fixed support section 2 as the movable support section 3 is guided by the guides.

An upper end 4a of the first spring 4 is fixed to the lateral frame member 7 of the fixed support section 2. A lower end 4b of the first spring 4 is fixed to the upper lateral frame member 10a of the movable support section 3. The first spring 4 expands or contracts in the vertical direction, thereby generating a biasing force FA in a vertically upward direction. The biasing force FA of the first spring 4 helps to support the movable support section 3 and the article A in such a way that the movable support section 3 and the article A can move in the vertical direction.

Furthermore, the movable support section 3 includes, as a movable cam that moves together with the movable support section, a cam groove 13: The cam groove 13 passes through the lower lateral frame member 10b in the front-back direction, and extends in the horizontal direction or in a direction perpendicular to the direction in which the movable support section is moved. The cam groove 13 includes a first movable cam surface 14a, which is on the upper side and faces downwards; and a second movable cam surface 14b, which is on the lower side and faces upwards; the first movable cam surface 14a and the second movable cam surface 14b face each other and run parallel.

In the cam groove 13, a cam follower member 15 is provided. The cam follower member 15 includes a first cam follower 16, which has a straight rod shape or circular tube shape that is circular in cross section and passes through the cam groove 13 in the front-back direction; and second roller-shaped cam followers 17, 17, which are provided on the front and rear ends of the first cam follower 16 that protrudes from the cam groove in the front-back direction.

The outer peripheral surfaces of the first cam follower 16 are in contact with first and/or second movable cam surfaces 14a, 14b when the first cam follower 16 moves in the left-right direction in the cam groove 13 along the cam groove. The second cam followers 17 are preferably rotatable with respect to the two ends of the first cam follower 16; the second cam followers 17 each are disposed in such a way as to be in contact with the fixed cam surface 9 of a corresponding fixed cam 8.

Around the lower lateral frame member 10b of the movable support section 3, a second spring 18, which is a compression coil spring, is fitted. The fixed cam 8's side end portion 18a of the second spring 18 is fixed to the first cam follower 16. The other side end portion 18b is fixed to an appropriate area of the lateral frame member 10b that is on the opposite side from the fixed cam 8. The second spring 18 is provided in such a way as to press the cam follower member 15, so that the second cam followers 17 are constantly pressed against the fixed cam surfaces 9.

At this time, as described later, the biasing force FB of the second spring 18 generates a force in a vertically upward direction or downward direction for the second cam followers 17, depending on the slope of the fixed cam surface 9. Due to the existence of the lateral frame member 10b, the second spring 18 is always compressed and kept straight without buckling.

According to the present embodiment, the cam groove 13 extends from an area near the fixed cam 8's side end portion of the lateral frame member 10b to the opposite side. Therefore, a range in which the cam follower member 15 can move in the horizontal direction in such a way that the second cam followers 17 remain in contact with the fixed cam surfaces 9, or horizontal stroke, can be set as large as possible. Accordingly, a range in which the biasing force FB of the second spring 18 can be used to press the second cam followers 17 against the fixed cam surfaces 9 can be made even wider.

When the article A is supported by the load support mechanism 1, the first spring 4 is stretched downward due to load W of the article A, and that force is conveyed via the movable support section 3, and the force acts in such a way that the downward-facing first movable cam surface 14a of the cam groove 13 pushes down the cam follower member 15. Meanwhile, the bias force FA of the first spring 4 is similarly conveyed via the movable support section 3, and the force acts in such away that the upward-facing second movable cam surface 14b of the cam groove 13 pushes up the cam follower member 15.

According to the above configuration, as can be seen from FIG. 2, in a plane perpendicular to the movement direction of the movable support section 3 or in the horizontal plane, the first spring 4 and the second spring 18 can be disposed in such a way as to overlap at least partially in the up-down direction. This arrangement makes it possible to make the depth of the load support mechanism 1 smaller or design a thin load support mechanism 1, when the load support mechanism 1 is turned into an actual device. This arrangement is also effective for the case where a large biasing force of the first spring 4 and/or the second spring 18 is required as the load to be supported becomes heavier, and the larger springs are therefore required.

According to another embodiment, as the first spring 4, instead of an extension coil spring, a compression coil spring is used; the first spring 4 is disposed below the movable support section 3 in such a way as to push up the movable support section 3. According to still another embodiment, instead of the first spring of FIG. 1, an additional compression coil spring is provided below the movable support section 3 in such a way as to push up the movable support section 3. In either case, the depth of the load support mechanism 1 can be made smaller, when the load support mechanism 1 is turned into an actual device.

According to the present embodiment, as shown in FIG. 2, two fixed cams 8 and two second cam followers 17 are provided along the axis direction of the first cam follower 16; the two fixed cams 8 and the two second cam followers 17 are provided on the opposite sides of the lower lateral frame member 10b in such a way as to be symmetric in the front-back direction and form a pair. Due to this arrangement, the force that the fixed cams 8 exert on the cam follower member 15 spread symmetrically in the front-back direction and in a well-balanced manner along the axis direction of the first cam follower 16. Therefore, this configuration is suitable because the first cam follower is unlikely to be bent or deformed. The dispersion of the force reduces the load on each fixed cam 8, and the fixed cams 8 can be made thinner. As a result, the entire device can be made thinner and lighter.

Furthermore, on the first cam follower 16, the pressing force of each fixed cam 8 is concentrated on the contact position and acts in the same direction. If the axial-direction length thereof is too long, the first cam follower 16 could bend or deform excessively, or break. According to the present embodiment, any other component does not exist between the lateral frame member 10b, on which the cam groove 13 is provided, and the fixed cams 8. Therefore, the first cam follower 16 can be short in the axis-direction length and is advantageous.

An area of the fixed cam surface 9 that comes in contact with the second cam follower 17 is divided into the following three regions, depending the position thereof. A first region S1 is a region where the normal direction at a contact point with the second cam follower is upward relative to the horizontal direction. A second region S2 is a region where the normal direction at a contact point with the second cam follower is substantially horizontal. In other words, in the second region S2, the tangential direction at the contact point with the second cam follower is substantially vertical. Here, the term "substantially" means that the direction is slightly upward or downward compared to the exact horizontal direction, and the degree of deviation thereof is small enough to be negligible in terms of the operation and effects of the present invention, the operation of the present embodiment, or the function. Therefore, the direction can be considered to be horizontal. A third region S3 is a region where the normal direction at a contact point with the second cam follower is downward relative to the horizontal direction.

Figure 3:
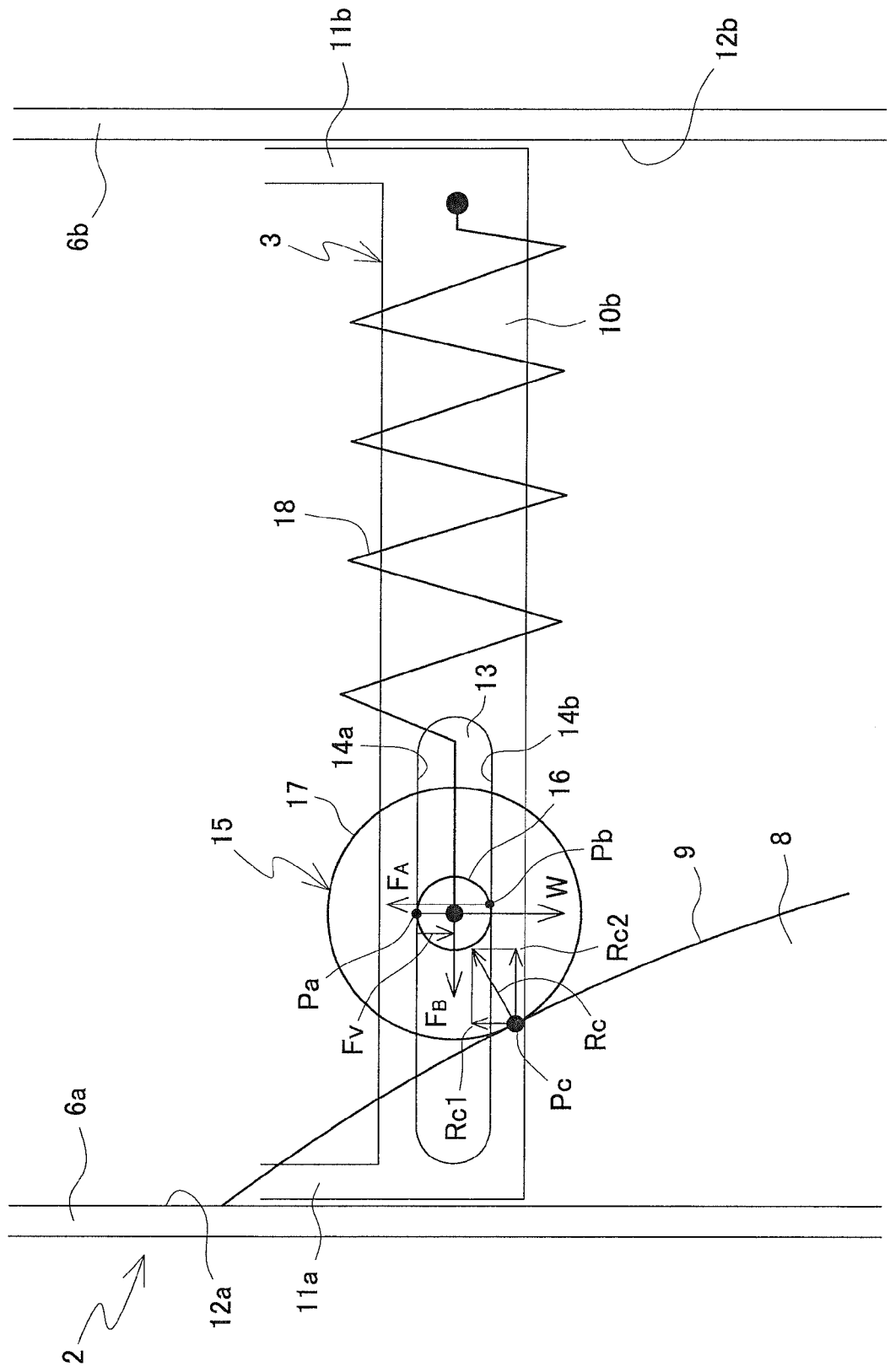
FIG. 3 is a diagram illustrating the relationship between major sections when a second cam follower is in a first region S1 of a fixed cam surface.

In FIGS. 1 and 2, the second cam follower 17 of the movable support section 3 carrying the article A remains still at an upper position that is within the first region S1 of the fixed cam surface 9. At this position, the amount of displacement of the first spring 4 is small, and the force FA of the spring is smaller than the load W. FIG. 3 schematically shows an equilibrium state of forces acting on a system made up of the cam follower member 15, the movable support section 3, and the fixed cam 8 at this stationary position.

For ease of explanation, the loads of the movable support section 3, second spring 18, and cam follower member 15, and the frictional forces between the guides 12a and 12b of the fixed support section 2 and the vertical frame members 11a and 11b of the movable support section 3, between the first cam follower 16 and the cam groove 13, and between the second cam follower 17 and the fixed cam 8 are omitted. Needless to say, those factors need to be taken into consideration in designing the actual device.

In this case, if the load or weight of the movable support section, second spring, and cam follower member is included among the forces acting on the system made up of the cam follower member, the movable support section, and the fixed cam, the equilibrium state is maintained when the sum of those forces is equal to or smaller than the frictional forces generated between the guides and the vertical frame members, between the first cam follower and the cam groove, and between the second cam follower and the fixed cam spring. When the movable support section 3 is in the equilibrium state and remains stationary at a certain position, the frictional forces help to keep the movable support section 3 at that stationary position.

For example, if a torque limiter is provided between the first cam follower 16 and the second cam follower 17, a force that keeps the movable support section at the stationary position may be a force that the torque limiter exerts between the two cam followers. If a contact surface of the second cam follower 17 with the fixed cam surface 9 is made of a material with a large friction coefficient such as rubber, the stationary-position holding force also can be obtained from a frictional force acting between the rubber surface and the fixed cam surface.

In general, the spring force F of a coil spring with a spring constant of k is represented by $F = k \cdot x$, with respect to the amount x of axis-direction displacement of the coil spring (or the amount of displacement from the free length of the spring or the length of the spring in an unloaded state; the compression direction is regarded as positive in this case). In order to support the article A in a stationary manner at an uppermost position of the movable support section 3, the first spring 4 already exerts an initial spring force (FA0=kA·xA0) in the vertically upward direction as the first spring 4 is stretched in advance by a predetermined initial displacement amount xA0 from the free length. At the same time, the second spring 18 already exerts an initial spring force (FB0=kB·xB0) in the vertically upward direction as the second spring 18 is similarly compressed in advance by a predetermined initial displacement amount xB0 from the free length.

In FIG. 3, between the first cam follower 16 and the cam groove 13, at contact point Pa with the first movable cam surface 14a, the load W of the article A acts on the first cam follower from the first movable cam surface in the vertically downward direction via the movable support section 3. In this state, ideally, the first cam follower 16 is assumed to be in contact not only with the first movable cam surface but also with the second movable cam surface 14b in such a way as to make the transmission of force possible. In such a case, at contact point Pb of the first cam follower 16 with the second movable cam surface 14b, the biasing force FA of the first spring 4 is considered to act on the first cam follower in the vertically upward direction.

Actually, it is difficult for the first cam follower 16 to come in contact with the second movable cam surface 14b in such a way as to make the transmission of force possible in such an ideal state. In this case, at the contact point Pb, the forces acting on each other do not exist. This situation is equivalent to the situation where, at the contact point Pa, from the first movable cam surface 14a to the first cam follower 16, a force Fv whose magnitude is calculated by subtracting the biasing force FA of the first spring 4 from the load W of the article A is being applied in the vertical downward direction. In either case, from the cam groove 13 to the first cam follower 16, the force Fv whose magnitude is calculated by subtracting the biasing force FA of the first spring 4 from the load W of the article A is substantially being applied in the vertical downward direction.

At contact point Pc between the second cam follower 17 and the fixed cam surface 9, the pressing force applied from the second cam follower to the fixed cam surface is balanced against reaction force Rc that is applied from the fixed cam surface in the normal direction thereof. The pressing force applied from the second cam follower to the fixed cam surface is the sum of the biasing force FB of the second spring 18 and the force Fv applied to the first cam follower 16 in the vertically downward direction as described above. The reaction force Rc of the fixed cam surface includes an upward vertical component Rc1 and a horizontal component Rc2.

When the second cam follower remains stationary at a certain position on the fixed cam surface, between the load W, the spring force FA of the first spring 4, and the vertical component Rc1 of the reaction force Rc, the following relation always holds theoretically, if the direction in which the force acts, or the vertically upward direction, is positive:

$W+FA+Rc1=0$

Incidentally, in the actual design, as described above, frictional forces are generated between the members. Even if the combined forces represented by this relational expression is not zero and has a small value, the equilibrium state would be maintained if the combined forces are less than the frictional forces between the members.

Between the biasing force FB of the second spring 18 and the horizontal component Rc2 of the reaction force Rc, the following relationship always holds theoretically, if the direction in which the force acts in the horizontal direction, or the direction toward the right side of the diagram, is positive:

$FB+Rc2=0$

Accordingly, the magnitude of the horizontal component Rc2 of the reaction force Rc is equal to that of the biasing force FB of the second spring 18. Based on the magnitude of the biasing force FB, the magnitude of the reaction force Rc and the magnitude of the vertical component Rc1 are determined.

In the case of FIG. 3, the spring force FA of the first spring 4 is smaller than the load W. Therefore, by applying the vertical component Rc1 of the reaction force Rc, which is applied from the fixed cam surface in the upward direction, as an assist force, the equilibrium with the load W in the vertical direction is achieved. In this state, if the movable support section 3 is pushed down or up, that force is added to the load W or the spring force FA, leading to the collapse of the equilibrium. Therefore, the article A can be easily lifted up or down by a relatively small force.

When the movable support section 3 is moved up or down, the cam follower member 15 moves downward or upward as the first cam follower 16 is shifted in the left-right direction along the cam groove 13 and as the second cam follower 17 is shifted in the left-right direction along the fixed cam surface 9. While the second cam follower is being located within the first region S1 of the fixed cam surface, the spring force FA of the first spring 4 is assisted by the upward vertical component Rc1 of the reaction force Rc in such a way as to achieve the equilibrium with the load W.

Inside the first region S1, as the movable support section 3 goes down and the amount of displacement of the first spring 4 increases, the spring force FA becomes larger accordingly. As a result, only a smaller assistance force is required from the vertical component Rc1 of the reaction force Rc. Therefore, the slope of the tangential direction of the fixed cam surface 9 relative to the vertical direction becomes smaller toward the lower second region S2.

Meanwhile, as the movable support section 3 goes down and the second cam follower 17 moves downward along the fixed cam surface 9, the amount of compression and displacement of the second spring 18 increases, leading to a rise in the spring force FB. As a result, the pressing force applied from the second cam follower to the fixed cam surface, i.e. the reaction force Rc, grows. The slope of the fixed cam surface 9 is preferably determined in such a way to gain an optimal assist force from the vertical component Rc1 of the reaction force Rc, by taking into consideration a change in the spring force FA of the first spring 4 as well as a change in the spring force FB of the second spring 18.

Figure 4:
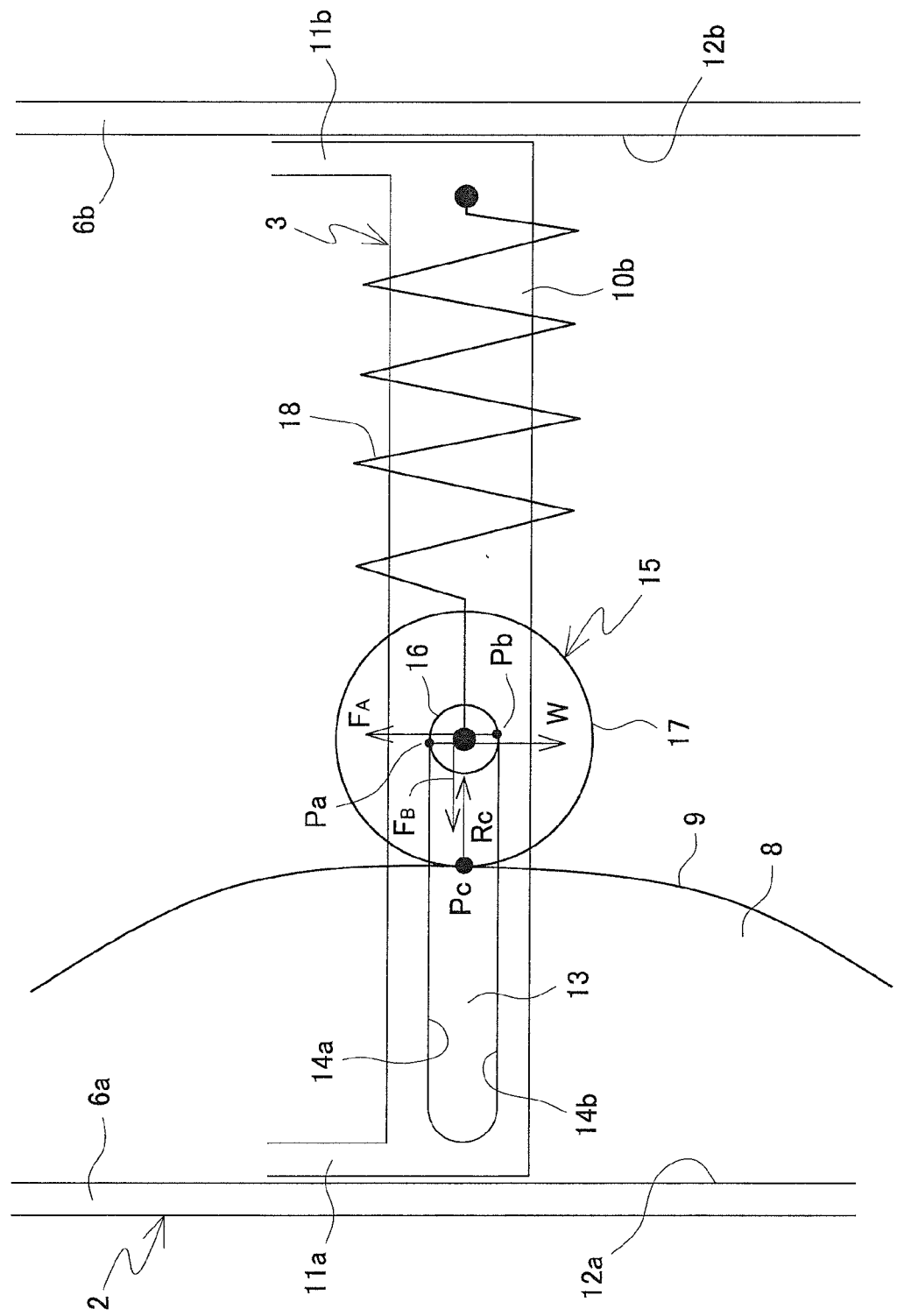
FIG. 4 is an explanatory diagram similar to FIG. 3 when a second cam follower is in a second region S2 of a fixed cam surface.

FIG. 4 schematically shows an equilibrium state of forces applied to the system made up of the cam follower member 15, the movable support section 3, and the fixed cam 8, when the movable support section 3 carrying the article A is pushed down from an upper position of FIG. 1 until the second cam follower 17 is stopped at a middle position within the second region S2 of the fixed cam surface 9 as indicated by imaginary line in FIG. 1. For ease of explanation, the loads of the movable support section 3, second spring 18, and cam follower member 15, and the frictional forces between the guides 12a and 12b of the fixed support section 2 and the vertical frame members 11a and 11b of the movable support section 3, between the first cam follower 16 and the cam groove 13, and between the second cam follower 17 and the fixed cam 8 are similarly omitted in the description below.

In this case, between the first cam follower 16 and the cam groove 13, in the vertical direction, the spring force FA of the first spring 4 is substantially balanced against the load W. Therefore, the spring force FA does not require an assist force from the reaction force Rc exerted by the fixed cam surface 9.

At contact point Pc between the second cam follower 17 and the fixed cam surface 9, the reaction force Rc from the fixed cam surface 9 is balanced against the biasing force FB that is applied to the second cam follower from the second spring 18, and does not contain a vertical component. Even in this state, if the movable support section 3 is pushed down or up, that force is added to the load W or the spring force FA, leading to the collapse of the equilibrium. Therefore, the article A can be easily lifted up or down with a relatively small force.

The movable support section 3 carrying the article A is further pushed down and is then stopped at a lower position where the second cam follower 17 is located within the third region S3 of the fixed cam surface 9 as indicated by imaginary line in FIG. 1. At this time, the amount of displacement of the first spring 4 further grows, and the spring force FA thereof becomes greater than the load W.

Figure 5:
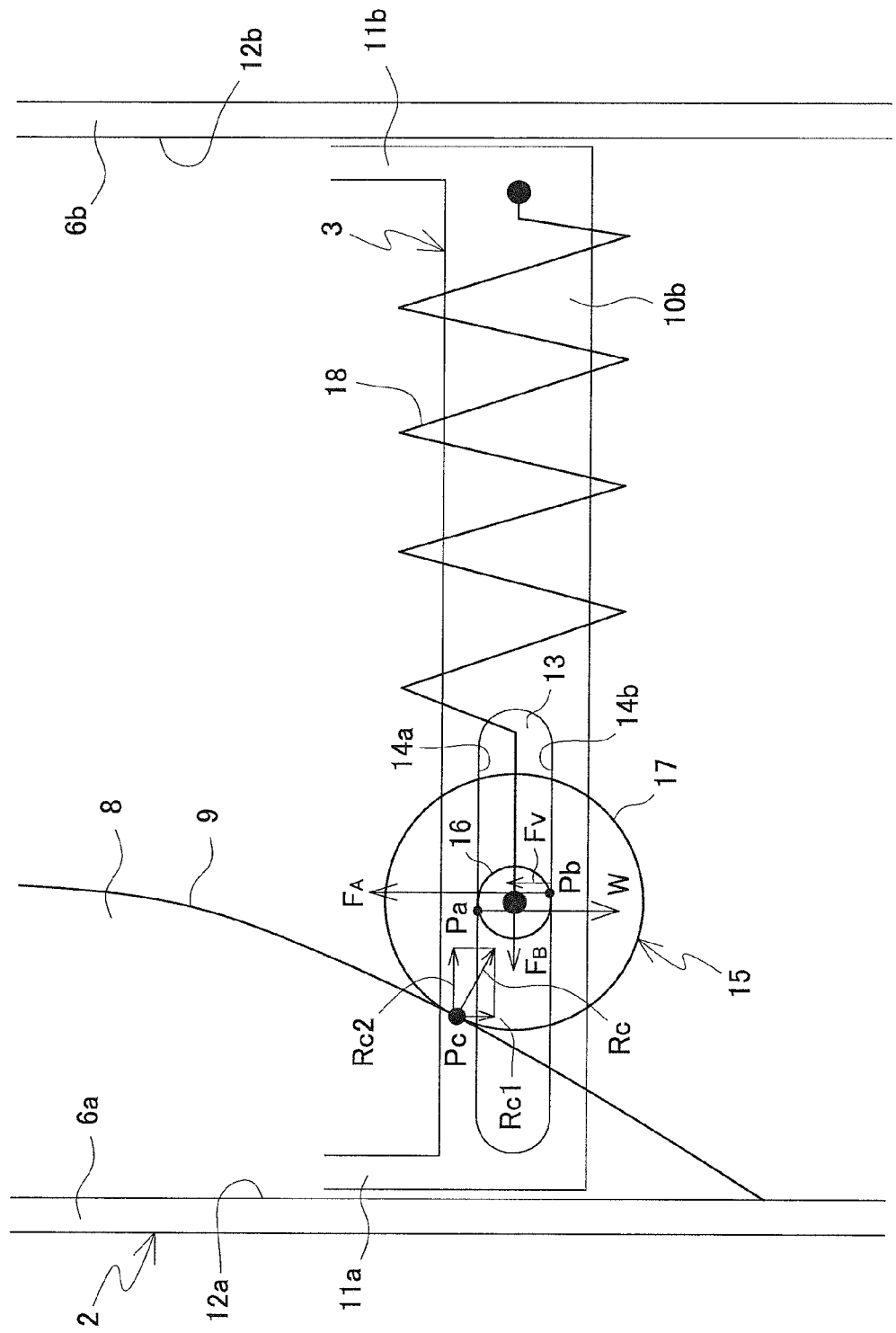
FIG. 5 is an explanatory diagram similar to FIG. 3 when a second cam follower is in a third region S3 of a fixed cam surface.

FIG. 5 schematically shows an equilibrium state of forces applied to the system made up of the cam follower member 15, the movable support section 3, and the fixed cam 8 at that stationary position. Similarly, for ease of explanation, the loads of the movable support section 3, second spring 18, and cam follower member 15, and the frictional forces between the guides 12a and 12b of the fixed support section 2 and the vertical frame members 11a and 11b of the movable support section 3, between the first cam follower 16 and the cam groove 13, and between the second cam follower 17 and the fixed cam 8 are omitted in the description below.

In the diagram, between the first cam follower 16 and the cam groove 13, at the contact point Pb with the second movable cam surface 14b, the biasing force FA of the first spring 4 is applied to the first cam follower in the vertically upward direction. In this state, ideally, the first cam follower 16 is assumed to be in contact not only with the second movable cam surface but also with the first movable cam surface 14a in such a way as to make the transmission of force possible. In such a case, at the contact point Pa of the first cam follower 16 with the first movable cam surface 14a, the load W of the article A is considered to act on the first movable cam surface in the vertically downward direction via the movable support section 3.

Actually, it is difficult for the first cam follower 16 to come in contact with the first movable cam surface 14a in such a way as to make the transmission of force possible in such an ideal state. In this case, at the contact point Pa, the forces acting on each other do not exist. This situation is equivalent to the situation where, at the contact point Pb, from the second movable cam surface 14b to the first cam follower 16, a force Fv whose magnitude is calculated by subtracting the load W of the article A from the biasing force FA of the first spring 4 is being applied in the vertical upward direction. In either case, to the first cam follower 16, the force Fv whose magnitude is calculated by subtracting the load W of the article A from the biasing force FA of the first spring 4 is substantially being applied in the vertical upward direction from the cam groove 13.

At contact point Pc between the second cam follower 17 and the fixed cam surface 9, the pressing force applied from the second cam follower to the fixed cam surface is balanced against the reaction force Rc that is applied from the fixed cam surface in the normal direction thereof. The pressing force applied from the second cam follower to the fixed cam surface is the sum of the biasing force FB of the second spring 18 and the vertically upward force Fv that is applied to the first cam follower 16 as described above. The reaction force Rc of the fixed cam surface contains a downward vertical component Rc1 and a horizontal component Rc2.

At the above lower position, the magnitude of the spring force FA of the first spring 4 is greater than the load W. Therefore, the vertical component Rc1 of the reaction force Rc that is applied from the fixed cam surface 9 in the downward direction works in a direction in which the upward biasing force of the spring force FA, or push-up force, is reduced. Accordingly, the equilibrium with the load W is achieved in the vertical direction. Even in this state, if the movable support section 3 is pushed down or up, that force is added to the load W or the spring force FA, leading to the collapse of the equilibrium. Therefore, the article A can be easily lifted up and down with a relatively small force.

When the movable support section 3 moves up or down, the cam follower member 15 moves downward or upward as the cam follower 16 is shifted in the left-right direction along the cam groove 13 and the cam follower 17 is shifted in the left-right direction along the fixed cam surface 9. When the second cam follower is being within the third region S3 of the fixed cam surface, the downward vertical component Rc1 of the reaction force Rc works in a direction in which the push-up force of the spring force FA of the first spring 4 is reduced, thereby achieving the equilibrium with the load W.

In the third region S3, when the amount of displacement of the first spring 4 becomes smaller as the movable support section 3 goes up, the spring force FA decreases accordingly. As a result, a smaller vertical component Rc1 of the reaction force Rc is required to reduce the push-up force of the spring force FA. Therefore, the slope of the tangential direction of the fixed cam surface 9 relative to the vertical direction becomes smaller toward the upper second region S2.

Meanwhile, the amount of compression and displacement of the second spring 18 grows as the movable support section 3 goes up and the second cam follower 17 moves up along the fixed cam surface 9, resulting in an increase in the spring force FB. As a result, the pressing force applied from the second cam follower to the fixed cam surface, or the reaction force Rc, becomes larger. The slope of the fixed cam surface 9 is preferably determined in such a way as to achieve an optimal reduction in the push-up force of the spring force FA, based not only on a change in the spring force FA of the first spring 4 but also on a change in the spring force FB of the second spring 18.

In that manner, according to the present embodiment, in the entire region of the fixed cam surface 9, an equilibrium between the load W of the article A acting on the system made up of the cam follower member 15, the movable support section 3, and the fixed cam 8, the spring force FA of the first spring 4, the spring force FB of the second spring 18, and the reaction force applied from the fixed cam 8 is achieved around the cam follower member 15. Therefore, in the up-down stroke range of the movable support section 3, the movable support section 3 carrying the article A can be stopped at a desired height position and kept at that position, or can be easily lifted up or down with a relatively small force.

The above-described basic configuration of the present invention may be changed or modified in various ways and embodied. For example, the lateral frame member 10b may be a tubular member, and the second spring 18 may be fitted into the tubular member. The movable support section 3 can take various configurations other than the above-described rectangular frame.

Furthermore, another set of the fixed cam 8, cam groove 13, cam follower member 15, and second spring 18 shown in FIG. 1 may be added and be disposed in mirror symmetry with respect to a left-right-direction center line of the fixed support section 2 and movable support section 3. In this case, it is preferred that the second springs be formed as one common compression spring, and that the cam follower members 15 be provided at both ends thereof. This left-right-direction symmetrical configuration reduces the load borne by the fixed cam, and can support a larger load in a well-balanced, stable manner in the left-right direction as a whole.

Figure 6:
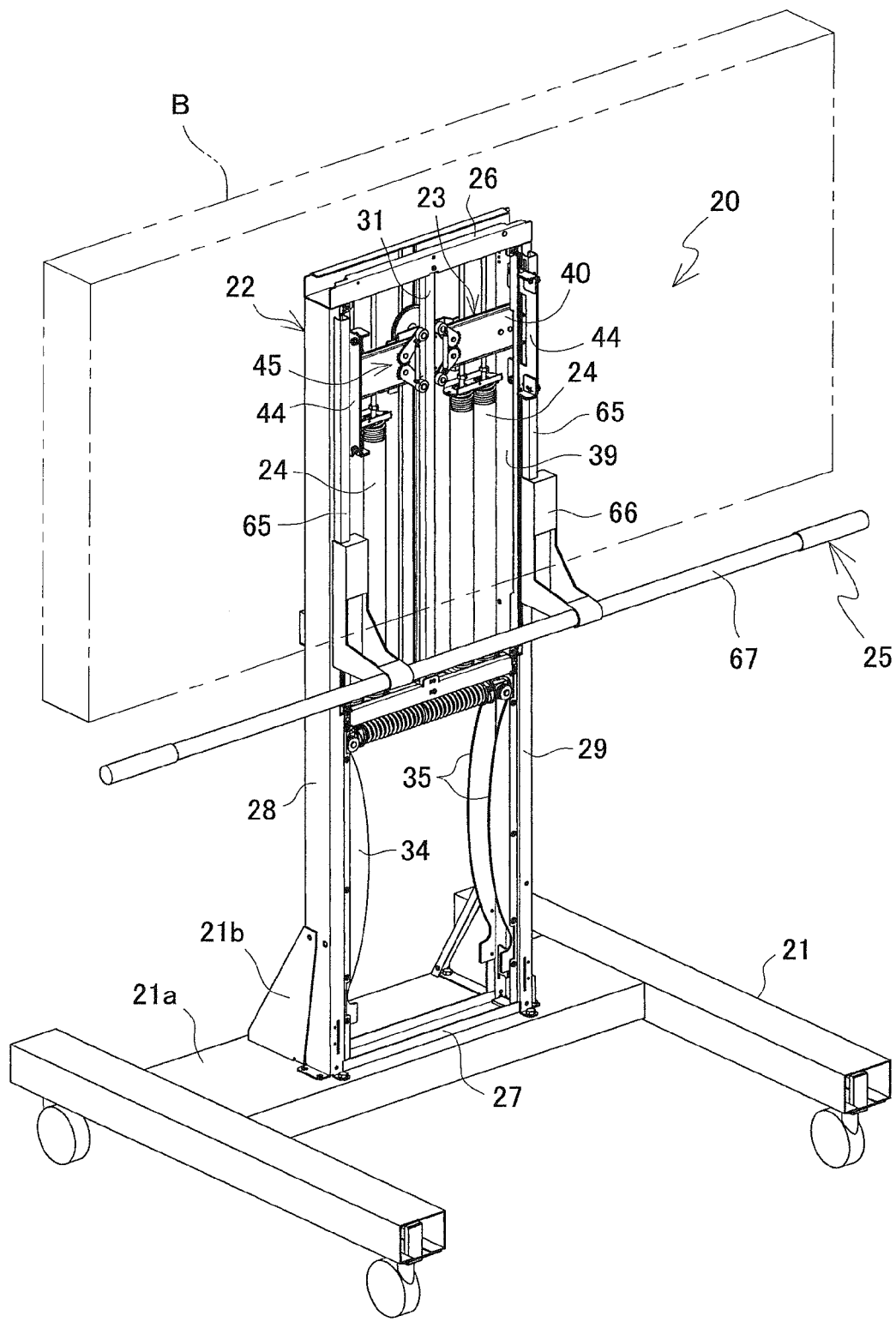
FIG. 6 is a perspective view of a first embodiment of an article support device to which the present invention is applied.
Figure 7:
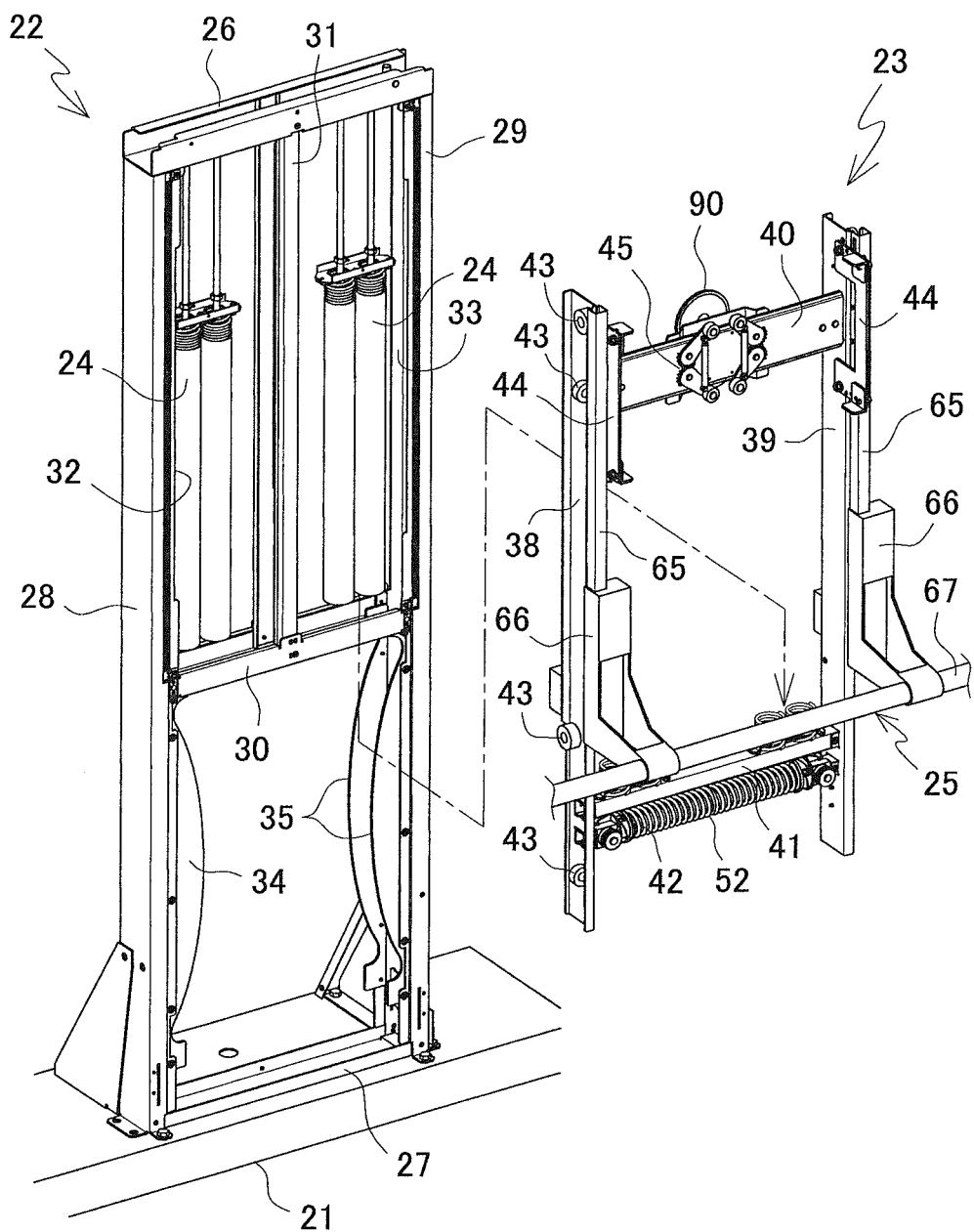
FIG. 7 is an exploded perspective view of the first embodiment of FIG. 6.
Figure 8:
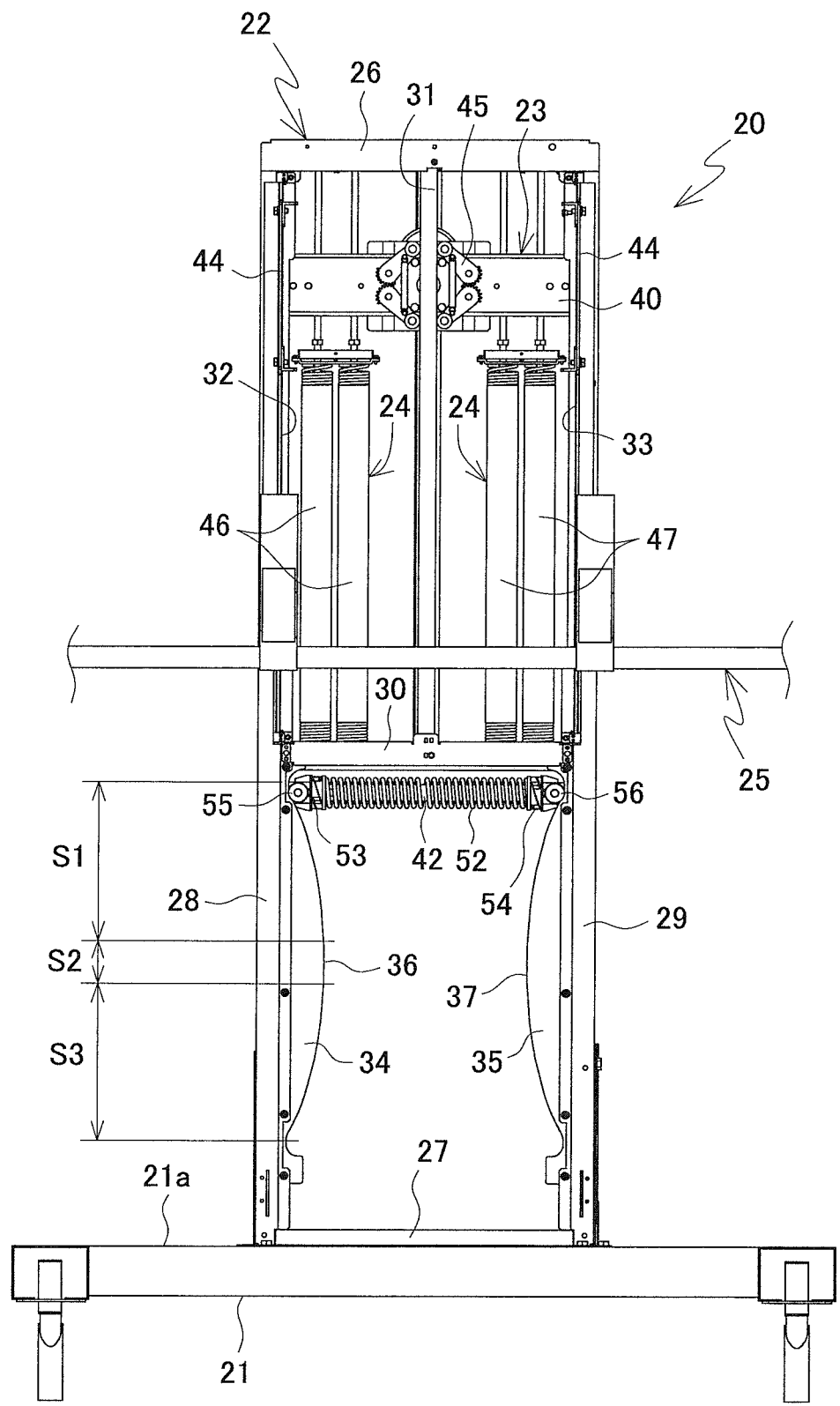
FIG. 8 is a front view of an article support device whose support frame section is at an uppermost position.

FIGS. 6 to 8 show an embodiment of an article support device to which such a modified example of the present invention has been specifically applied. An article support device 20 of the present embodiment is designed to support a relatively heavy article B, such as a large-screen television monitor. The article support device 20 includes a base 21, which is placed on a floor surface or the like in a movable manner; a fixed frame section 22, which is fixed to the base; a support frame section 23, which is mounted on the fixed frame section in such a way as to be able to move up and down; a first sprint 24; and an operation handle section 25, which is used to move up or down the support frame section 23.

As described later, the article B is integrally attached to the support frame section 23 in a detachable manner. A lower portion of the fixed frame section 22 is erected and firmly fixed by stays 21b to an upper surface of a base plate 21a of the base 21.

The fixed frame section 22 is a roughly rectangular frame structure, including upper and lower frames 26 and 27, which extend horizontally, and left and right side frames 28 and 29, which extend vertically between the upper frame and the lower frame. Furthermore, at the center of the fixed frame section 22, a first brake rail 31 is provided in such a way as to extend vertically between the upper frame and an intermediate frame 30, which extends horizontally between the left and right side frames 28 and 29 and is substantially located at a mid-height position.

Figure 9A:
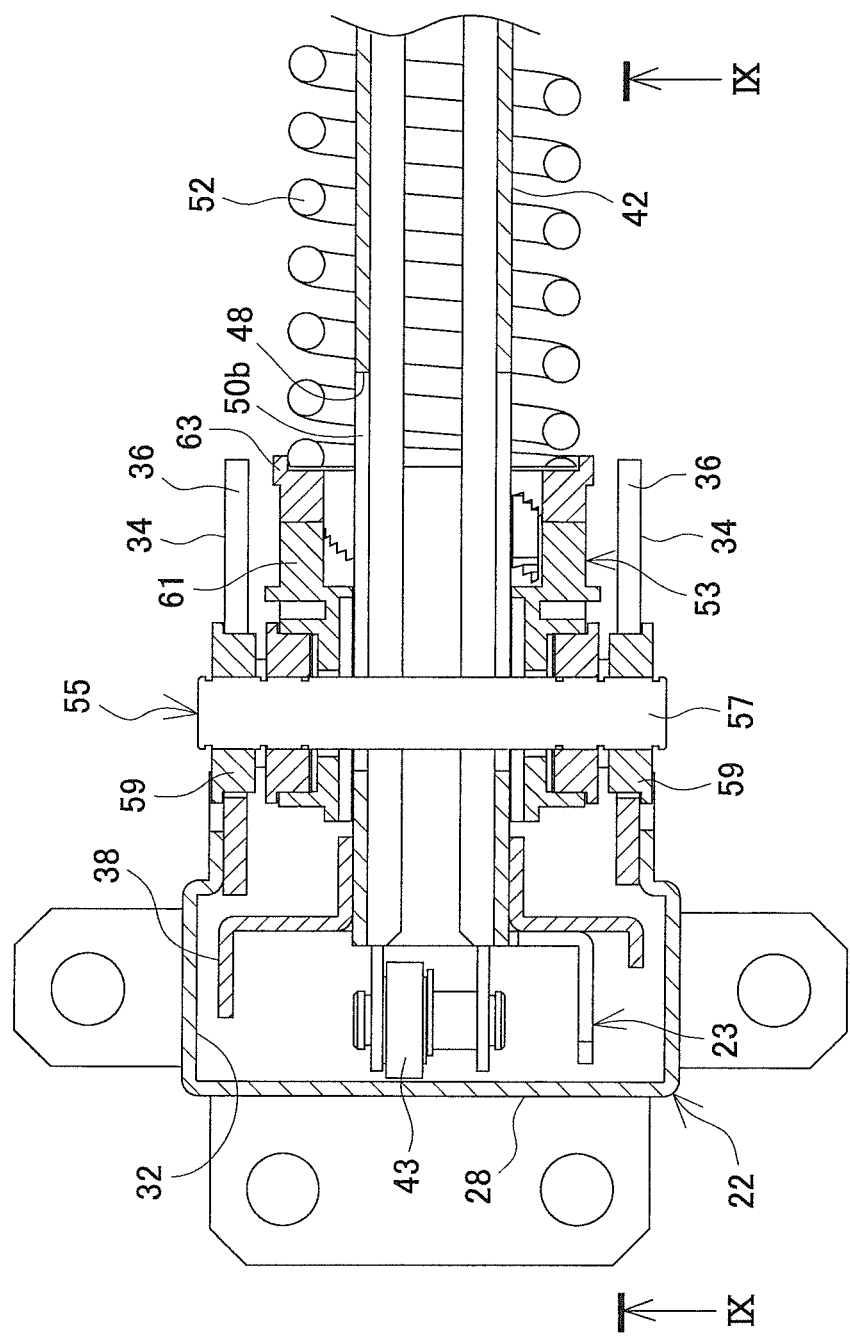
FIG. 9A is a partially enlarged vertical cross-sectional view of FIG. 8, with one cam follower being viewed from above.

FIG. 9A shows the cross-section of one side frame 28 of the fixed frame section 22. The other side frame 29 is formed exactly symmetrically to the side frame 28, and therefore is not shown in the diagram. As shown in FIG. 9A, in the side frame 28 or 29, a guide rail 32 or 33 is formed from an almost upper end of the side frame to a lower end: the guide rail 32 or 33 is U-shaped in cross-section and open to the inner side of the frame structure.

To the inner-side portion of the left or right side frame 28 or 29 of the fixed frame section 22 that is lower than the intermediate frame 30, a fixed cam member 34 or 35 is attached symmetrically in the left-right direction. The fixed cam member 34 or 35 includes two cam plates, which are long in the up-down direction and fixed to the front and back surfaces of the side frame 28 or 29 and which run parallel to each other. The fixed cam member 34 or 35 includes a fixed cam surface 36 or 37, which extends from around an upper end thereof to around a lower end. The fixed cam surface 36 or 37 forms a convex shape in a direction in which the fixed cam surfaces 36 and 37 face each other. The fixed cam surface 36 or 37 is provided in such a way that the slope of the tangential direction thereof is curved and is changed across the entire length from an upper end to a lower end or changed partially.

The support frame section 23 is a roughly rectangular frame structure, including left and right guide frames 38 and 39, which extend vertically, an upper frame 40, which extends horizontally between the two guide frames, and two lower frames 41 and 42, which are slightly separated in the up-down direction. The support frame section 23 is mounted on the fixed frame section 22 in such a way as to be able to move up and down along the guide rails, as the left and right guide frames 38 and 39 are fitted into the guide rail 32 and 33 of the corresponding left and right side frames 28 and 29 of the fixed frame section in a slidable manner.

On the left and right guide frames 38 and 39, a plurality of rollers 43 are mounted in such a way as to slide and roll on the inner surfaces of the guide rails; the rollers 43 are intended to reduce or eliminate a frictional force generated between the left and right guide frames 38 and 39 and the inner surfaces of the guide rails 32 and 33 when the left and right guide frames 38 and 39 slide inside the guide rails 32 and 33, and other kinds of resistance. Therefore, the support frame section 23 can smoothly move in the up-down direction without rattling or being displaced in the left-right direction with respect to the fixed frame section 22.

As described above, the support frame section 23 is mounted in such a way that the outer frame of the support frame section 23 is directly supported by the outer frame of the fixed frame section 22. Therefore, the structural strength of the support frame section 23 itself and the entire device is improved. As a result, the article support device 20 that can bear a high load and has a high strength structure can be realized: the article support device 20 can handle a heavier article B.

On the support frame section 23, a pair of left and right mounting stays 44 are provided in such a way as to extend vertically just ahead of the guide frames; the mounting stays 44 are used to fix the article B. Furthermore, in the support frame section 23, at the center of the upper frame 40, a brake device 45 is provided. As described later, by the operation handle section 25, the brake device is engaged or the engagement is released.

The first spring 24 includes two extension coil springs 46 just near the inner side of the left guide frame 38 of the support frame section 23, and two extension coil springs 47 just near the inner side of the right guide frame 39; the extension coil springs 46 and 47 are disposed symmetrically in the left- and right direction and in parallel in the left-right direction. An upper end of each of the extension coil springs 46 and 47 is fixed to the upper frame 26 of the fixed frame section 22 in such a way that each of the extension coil springs 46 and 47 hangs vertically; a lower end of each of the extension coil springs 46 and 47 is fixed to the upper-side lower frame 41 of the support frame section 23.

Figure 9B:
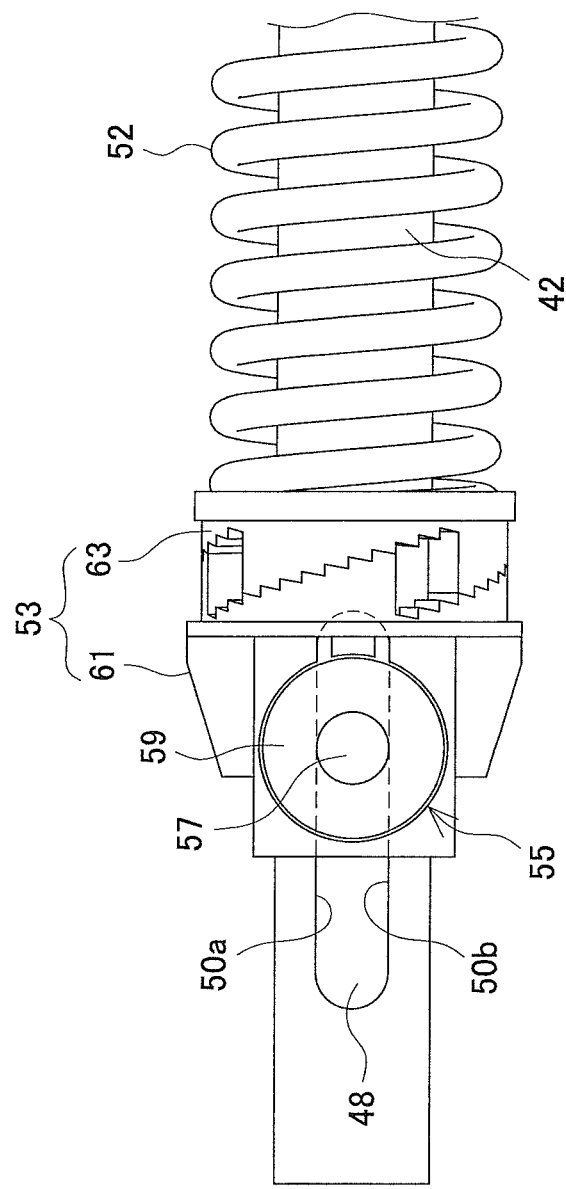
FIG. 9B is a view as seen in the direction of arrow along line IX-IX of FIG. 9A, with a fixed cam member omitted.
Figure 10:
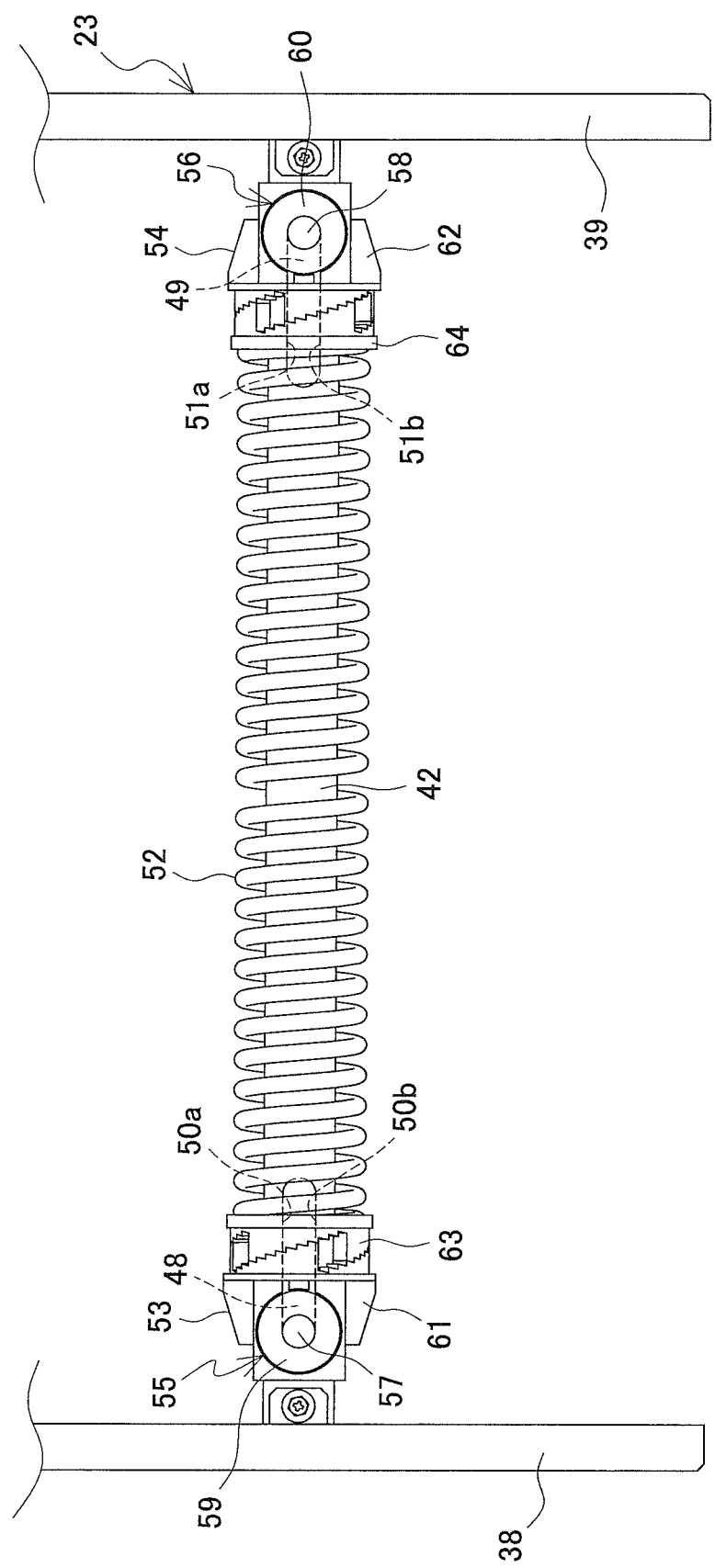
FIG. 10 is an enlarged view showing a lower frame below a support frame section, and a second spring.

As shown in FIG. 10, on the lower-side lower frame 42 of the support frame section 23, two cam grooves 48 and 49 are so provided as to be symmetrical in the left-right direction; the two cam grooves 48 and 49 pass through the lower frame in the front-back direction. As for the cam groove 48 which is shown in the left section of the diagram, as shown in FIGS. 9A and 9B, each cam groove 48 or 49 includes a first movable cam surface 50a or 51a, which extends horizontally a predetermined distance from around a left or right end of the lower frame 42 toward the opposite side and which is located on the upper side and faces downward; and a second movable cam surface 50b or 51b, which is located on the lower side and faces upward. The first movable cam surface 50a or 51a and the second movable cam surface 50b or 51b face each other and run parallel to each other.

Onto the lower frame 42, a second spring 52, which is a compression coil spring, is fitted. In this manner, the second spring 52 is fitted onto the straight lower frame 42, which is part of the support frame section 23. This configuration can reliably prevent buckling, which could occur due to the compression of the second spring 52. According to another example, the second spring 52 may be fitted into a tubular lower frame 42.

On the left and right sides of the second spring 52, via cam follower holders 53 and 54, into which the lower frame 42 is inserted in such a way as to allow the cam follower holders 53 and 54 to freely slide, cam follower members 55 and 56 are provided. As for the cam follower member 55 shown in the left section of the diagram, as shown in FIG. 9A, the cam follower member 55 or 56 includes a straight, rod-shaped first cam follower 57 or 58, which is circular in cross-section and passes through the cam groove 48 or 49 in the front-back direction. Furthermore, the cam follower member 55 or 56 includes roller-shaped second cam followers 59 or 60, which are provided on the front and rear ends of the first cam follower 57 or 58 that protrudes from the cam groove in the front-back direction.

The first cam follower 57 or 58 can move in the left-right direction in the cam groove 48 or 49 along the cam groove, as the outer peripheral surface of the first cam follower 57 or 58 is being in contact with the first movable cam surface 50a or 51a and the second movable cam surface 50b or 51b. The second cam followers 59 or 60 may be mounted in a rotatable manner with respect to the two ends of the first cam follower 57 or 58, for example, via a rolling bearing.

The second cam followers 59 or 60 are disposed in such a way as to be in contact with the fixed cam surface 36 or 37 of the corresponding fixed cam member 34 or 35. The second cam followers 59 or 60 are pressed by the second spring 52 in a horizontally outward direction, against the fixed cam surface 36 or 37 of the corresponding fixed cam member 34 or 35.

As for the cam follower holder 53 shown in the left section of the diagram, as shown in FIG. 9B, the cam follower holder 53 or 54 includes an outer-side first holder member 61 or 62, which extends along the axis direction of the second spring 52; and an inner-side second holder member 63 or 64. For example, the first holder member holds the first cam follower 57 or 58 in a rotatable manner via a bearing. The second holder member is a spring receiver, an end surface of which receives an end portion of the second spring 52.

The first holder member 61 or 62 and the second holder member 63 or 64 each includes an abutting surface on which a plurality of steps are provided in a terraced manner in the circumferential direction in such a way as to be complementarily engageable; the first holder member 61 or 62 and the second holder member 63 or 64 form a meshing joint when being joined together. The first holder member 61 or 62 and the second holder member 63 or 64 are rotated in the circumferential direction relative to each other, so that the abutting position of the members is changed. In this manner, the axis-direction length of the cam follower holder 53 or 54 can be changed.

As shown in FIG. 9A, the two cam plates of the fixed cam member 34 are disposed along the axis direction of the cam follower member 55 in such a way as to be symmetric in the front-back direction. Therefore, the each cam plate's force to press the cam follower member 55 is dispersed along the axis direction, and acts symmetrically in the front-back direction. Although not shown in the diagrams, in the other cam follower member 56, the pressing force that each cam plate of the fixed cam member 35 exerts is similarly dispersed along the axis direction, and acts symmetrically in the front-back direction. Accordingly, the cam follower members 55 and 56 are kept in the cam grooves 48 and 49 stably and horizontally. The dispersion of the force reduces the burden on each cam plate of the fixed cam member 35. Therefore, the cam plates can be made thinner. As a result, the entire device can be made thinner and lighter.

Moreover, between each cam plate of the fixed cam member 34 or 35 and the lower frame 42 of the support frame section 23 on which the cam groove 48 or 49 is provided, another component does not exist, allowing those parts to be placed at smaller intervals in the front-back direction. As a result, the axis-direction length of the first cam followers 57 and 58 of the cam follower members 55 and 56 can be made shorter, eliminating in advance the risk of being excessively bent, deformed, or broken, which the device could have faced if the first cam followers were too long.

Figure 11:
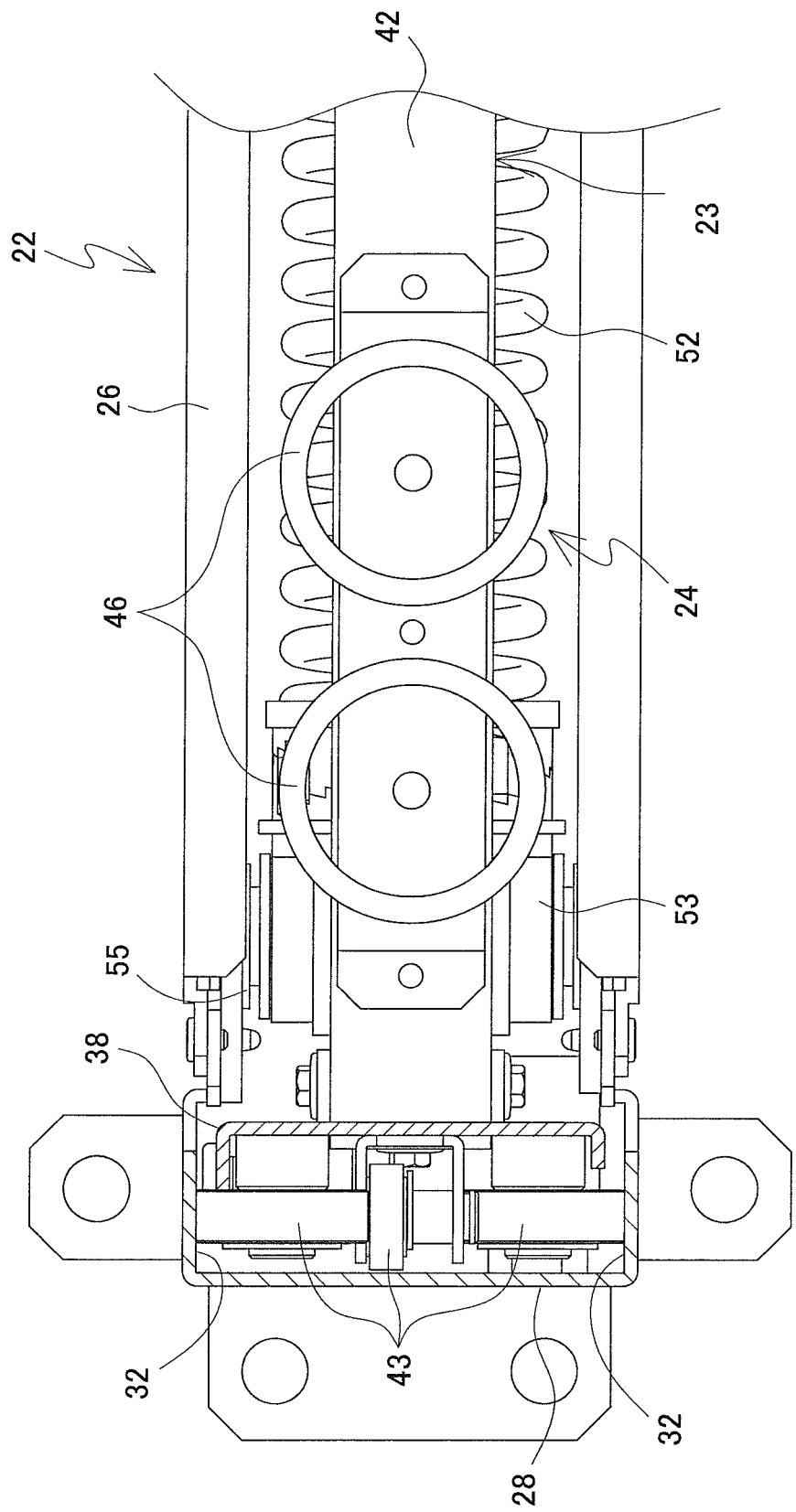
FIG. 11 is a partially enlarged view of a support frame section as viewed from above in a planar manner.

FIG. 11 is a partially enlarged view of the left portion in the diagram of the support frame section 23 as seen from above in planar view. As shown in the diagram, in the article support device 20 of the present embodiment, the almost entire extension coil springs 46 of the first spring 24 are disposed on a plane in such a way as to overlap with the second spring 52 in the up-down direction. Although not shown in the diagram, the almost entire extension coil springs 47 on the other side are similarly disposed on a plane in such a way as to overlap with the second spring 52 in the up-down direction. This arrangement helps to minimize the depth of the article support device 20 and thereby make the article support device 20 thinner even if the outer diameters of the first spring 24 and/or the second spring 52 become larger.

As shown in FIG. 8, as described above in relation to FIG. 1, the fixed cam surface 36 or 37 is divided into the following three regions, depending on the contact position with the second cam follower 59 or 60. A first region S1 is a region where the normal direction at a contact point with the second cam follower is upward relative to the horizontal direction. A second region S2 is a region where the normal direction at a contact point with the second cam follower is substantially horizontal; that is, the second region S2 is a region in which the tangential direction is substantially vertical. As described above, the term "substantially" means that the direction is slightly upward or downward compared to the exact horizontal direction, and the degree of deviation thereof is small enough to be negligible in terms of the operation and effects of the article support device 20, or the operation of the article support device 20, or the function. Therefore, the direction can be considered to be horizontal. A third region S3 is a region where the normal direction at a contact point with the second cam follower is downward relative to the horizontal direction.

The operation handle section 25 includes left and right vertical transmission rods 65, which are mounted on front portions of the left and right guide frames 38 and 39 of the support frame section 23. To a lower portion of each transmission rod 65, an almost L-shaped connection stay 66 is joined. Tip end portions of the two connection stays 66 that protrude forward hold a handle lever 67, which is long and extends in the left-right direction. The handle lever 67 is grabbed by hands to operate the operation handle section 25 and thereby lift up or down the support frame section 23 and the article B.

Figure 12:
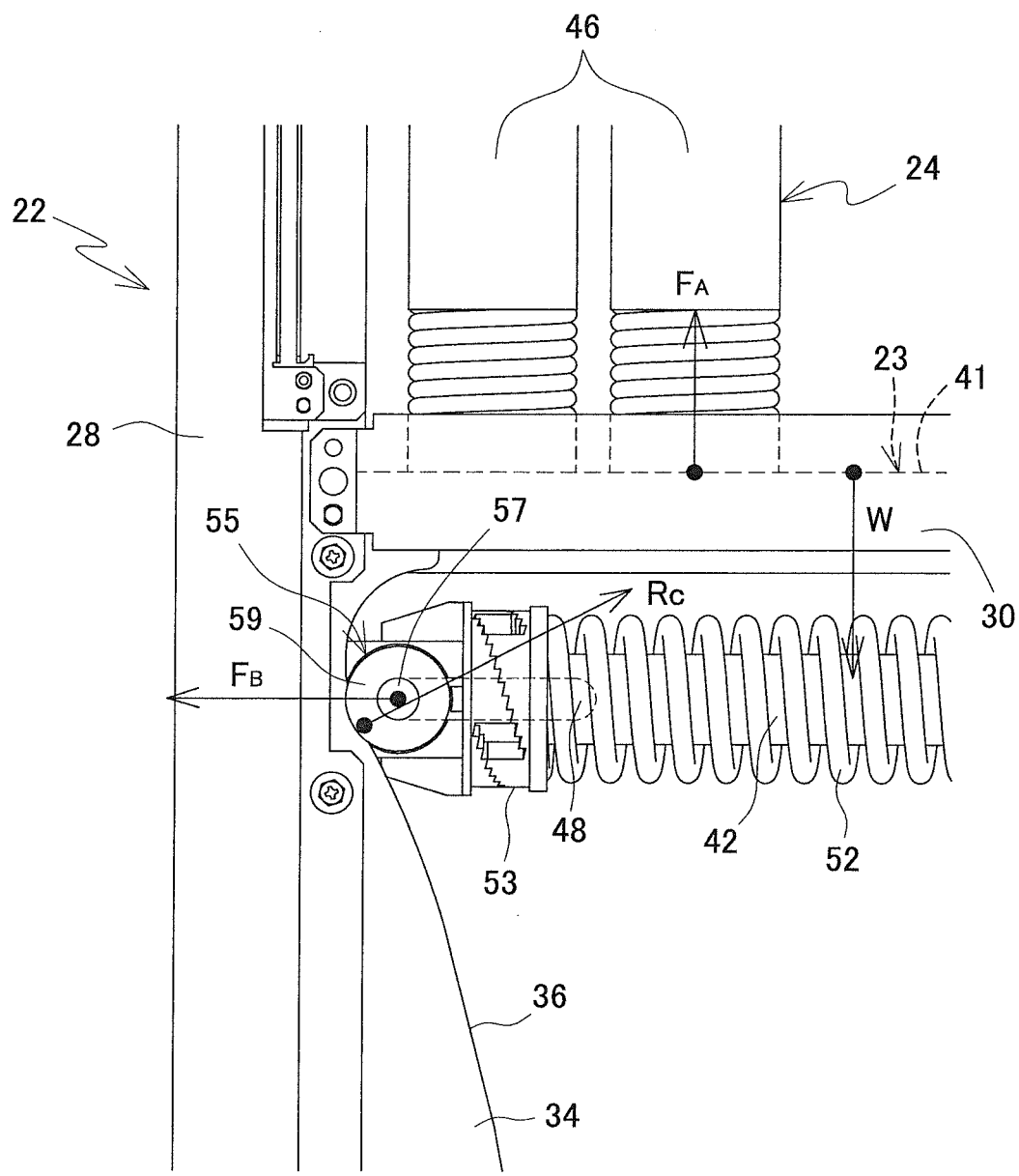
FIG. 12 is a partially enlarged view showing a fixed cam surface of FIG. 8 and a cam follower member.

FIGS. 8 and 12 show the case where the support frame section 23 on which the article B is mounted is located at an uppermost position of a movement range thereof. The second cam followers 59 and 60 remain stationary at the upper ends of the first regions S1 of the fixed cam surfaces 36 and 37. At this position, the load W of the article B acting on the system made up of the cam follower members 55 and 56, the fixed frame section 22, and the support frame section 23, the spring force FA of the first spring 24, the spring force FB of the second spring 52, and the reaction force applied from the fixed cam surfaces are balanced against each other around the cam follower members.

In the first region S1, the amounts of displacement of the extension coil springs 46 and 47 of the first spring 24 are small, and that spring force FA is smaller than the load W of the article B. The reaction force Rc that is applied to the second cam follower 59 from the fixed cam surface 36 contains an upward vertical component. Therefore, this component is used as an assist force and is added to the spring force FA of the first spring 24. As a result, an equilibrium with the load W is achieved in the vertical direction.

Figure 13:
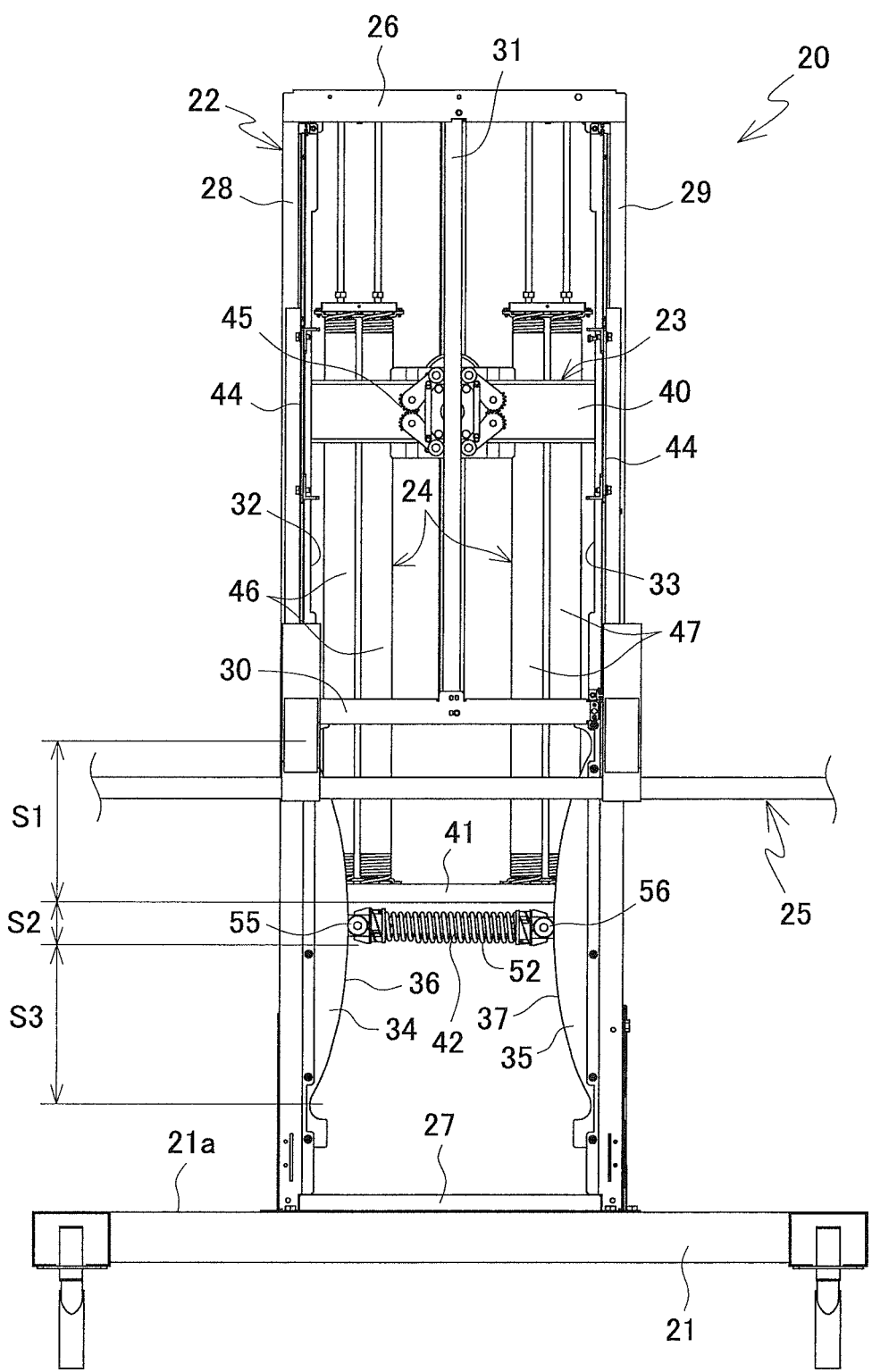
FIG. 13 is a front view similar to FIG. 8 when a support frame section is at a middle position.
Figure 14:
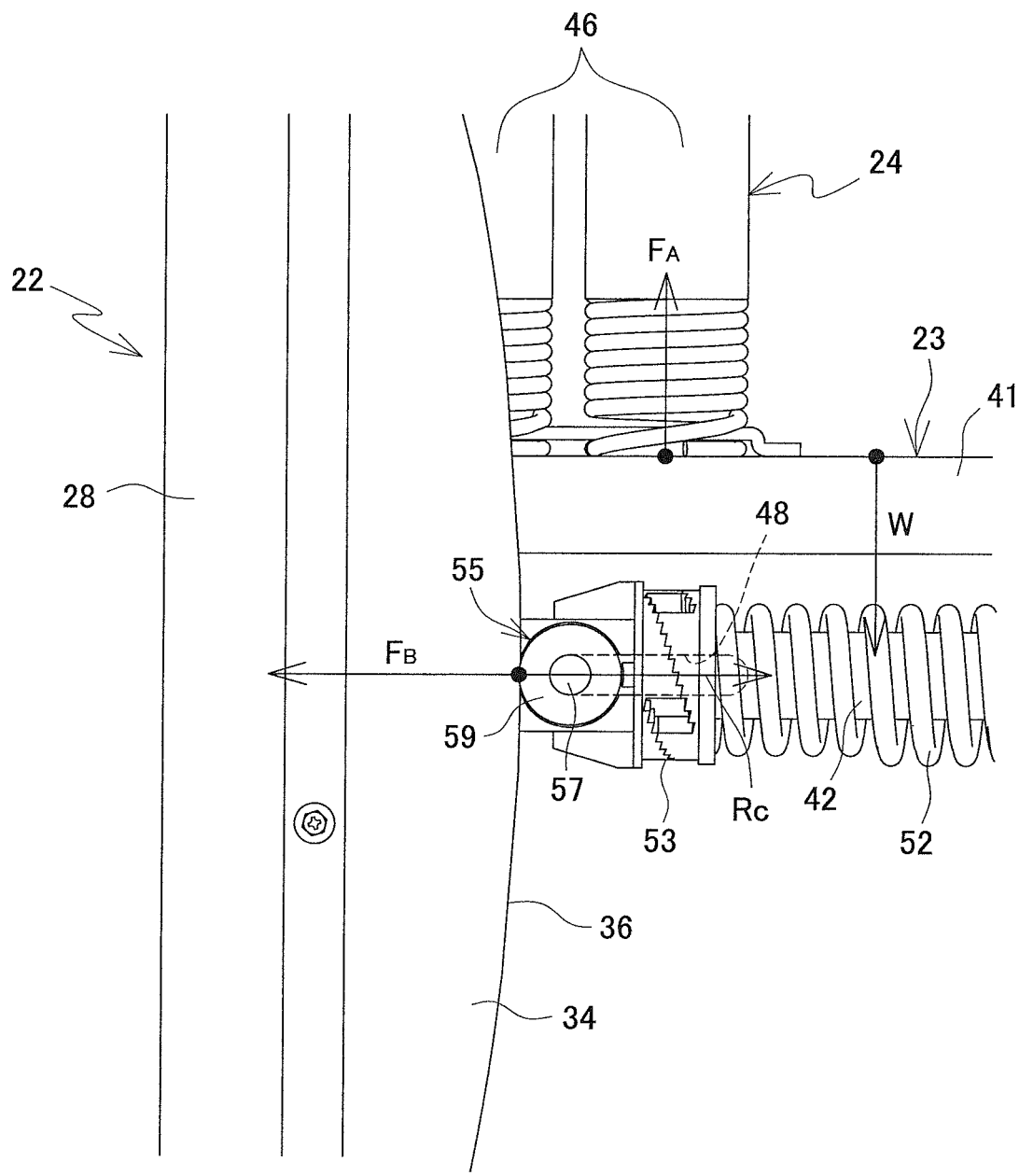
FIG. 14 is a partially enlarged view showing a fixed cam surface of FIG. 12 and a cam follower member.

FIGS. 13 and 14 show the case where the support frame section 23 on which the article B is mounted is located at a middle position of the movement range thereof. The second cam followers 59 and 60 remain stationary at a position inside the second region S2 of the fixed cam surfaces 36 and 37. Even at this middle position, the load W of the article B acting on the system made up of the cam follower members, the fixed frame section, and the support frame section, the spring force FA of the first spring, the spring force FB of the second spring, and the reaction force applied from the fixed cam surfaces are balanced against each other around the cam follower members.

In the second region S2, the spring force FA of the first spring 24 is substantially balanced against the load W. In effect, the reaction force Rc applied from the fixed cam surfaces 36 and 37 only contains a horizontal component, and is balanced against the spring force FB of the second spring 52, and does not include a vertical component.

Figure 15:
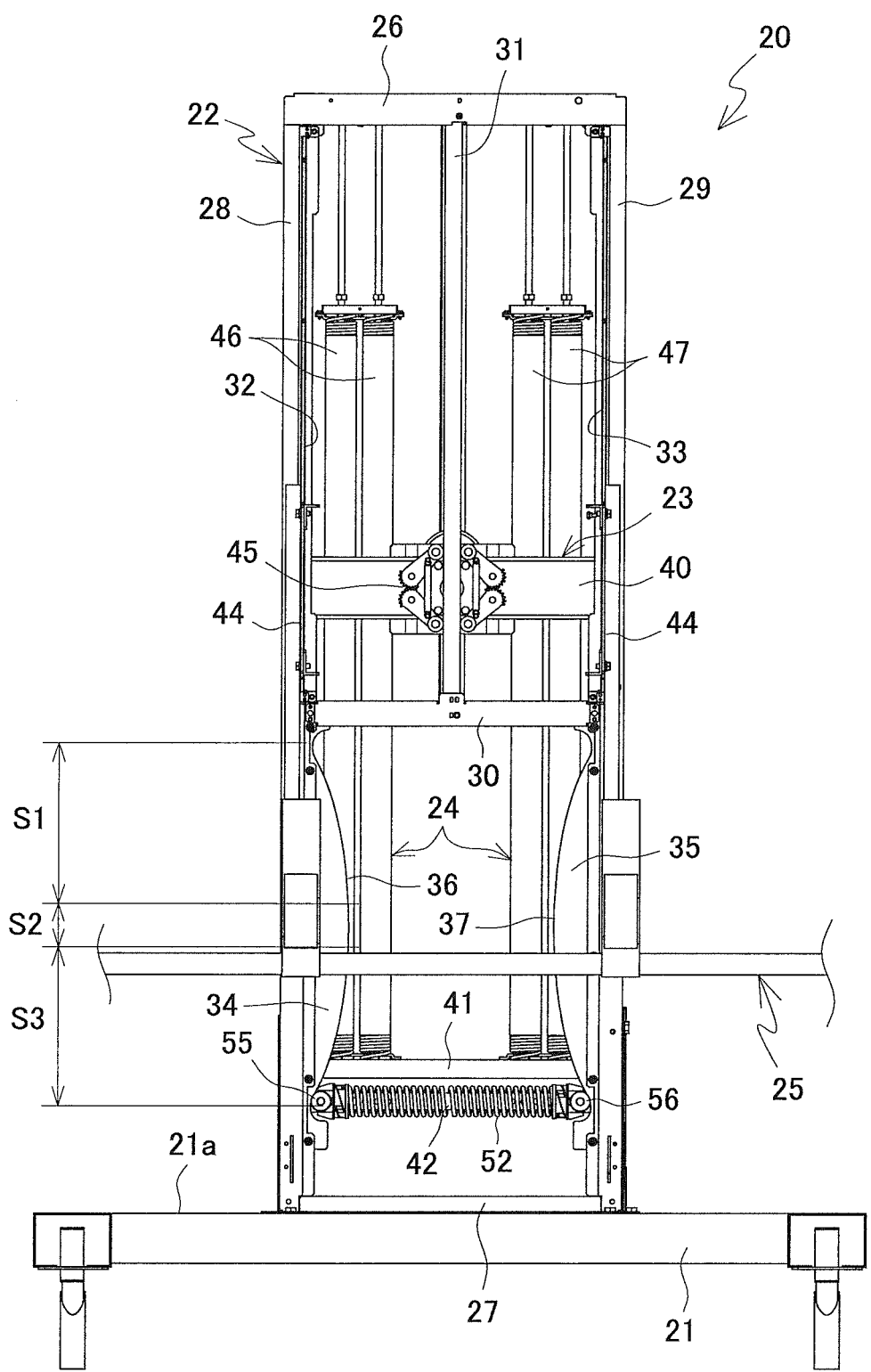
FIG. 15 is a front view similar to FIG. 8 when a support frame section is at a lowermost position.
Figure 16:
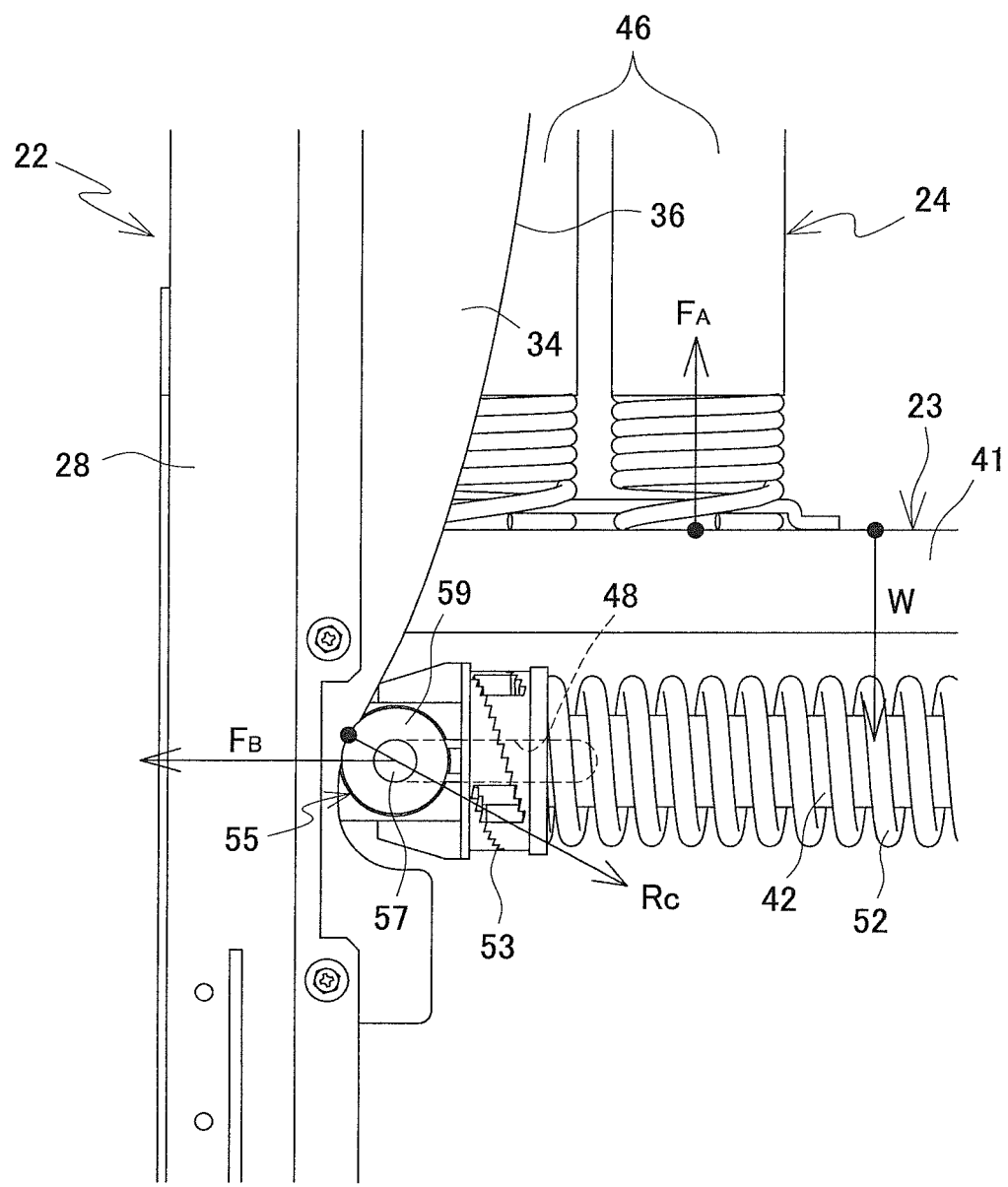
FIG. 16 is a partially enlarged view showing a fixed cam surface of FIG. 15 and a cam follower member.

FIGS. 15 and 16 show the case where the support frame section 23 on which the article B is mounted is located at a lowermost position of the movement range thereof. The second cam followers 59 and 60 remain stationary at the lower end of the third region S3 of the fixed cam surfaces 36 and 37. Even at this lower-end position, the load W of the article B acting on the system made up of the cam follower members, the fixed frame section, and the support frame section, the spring force FA of the first spring, the spring force FB of the second spring, and the reaction force applied from the fixed cam surfaces are balanced against each other around the cam follower members.

In the third region S3, the amounts of displacement of the extension coil springs 46 and 47 of the first spring 24 are large, and the spring force FA thereof is larger than the load W of the article B. The reaction force Rc that is applied to the second cam follower 59 from the fixed cam surface 36 contains a downward vertical component, which acts in a direction in which the push-up force of the spring force FA of the first spring 24 is reduced. As a result, the force is balanced against the load W in the vertical direction.

If the load W of the article B becomes smaller, the spring force FA of the first spring 24 becomes relatively larger because the first spring 24 remains the same. Therefore, in the first region 51, the assist force added to the spring force FA from the fixed cam surface needs to be smaller; in the third region S3, the force that is applied downward to reduce the push-up force of the spring force FA needs to be larger.

If the load W of the article B becomes larger, the spring force FA of the first spring 24 becomes relatively smaller. Therefore, in the first region 51, the assist force added to the spring force FA from the fixed cam surface needs to be larger; in the third region S3, the force that is applied downward to reduce the push-up force of the spring force FA needs to be smaller.

In the article support device 20, the axis-direction length of the cam follower holders 53 and 54 are changed to adjust the amount of compression and displacement of the second spring 52. In this manner, the adjustment is made in such a way as to increase or decrease the biasing force FB of the second spring 52 that is at the same height position of the support frame section 23, or the reaction force Rc applied from the fixed cam surface. If the load W is small, the axis-direction length of the cam follower holders is shortened to reduce the biasing force FB of the second spring 52, thereby decreasing the reaction force Rc applied from the fixed cam surface and the vertical component thereof. If the load W is large, the axis-direction length of the cam follower holders is increased to boost the biasing force FB of the second spring 52, thereby increasing the reaction force Rc applied from the fixed cam surface and the vertical component thereof.

In the article support device 20, since the forces are balanced in the vertical direction at the stationary position, the article B can easily be moved with a relatively small force from any height position to another height position. However, if the mass of the article is increased, an inertial force acting on the moving article increases accordingly, and it might be difficult to stop at a desired position. In the worst case scenario, the support frame section 23 carrying the article B could violently hit the fixed frame section 22 at the upper or lower end of the movement range or of the up-down stroke.

As a means to solve the above problem, in general, what is known is an elastic body, such as a damper, shock absorber or rubber, which works to attenuate or absorb kinetic energy. For example, if a gas spring or an oil damper, which makes use of fluid resistance, is used, it becomes difficult to handle the device and the device becomes expensive, as the device as a whole becomes complicated, larger, and heavier. The elastic body such as rubber may not always be sufficiently effective.

The article support device 20 of the present embodiment includes a cushioning mechanism of an effective, simple configuration to slow down the movement of the support frame section 23 at the upper and lower ends of the up-down stroke of the support frame section 23 and thereby stop the support frame section 23 without a large shock. The cushioning mechanism is realized in an effective manner based on the basic technical concept of the present invention by applying a new, novel idea to the cam plates of the fixed cam members 34 and 35 that drive the second cam followers 59 and 60, as described below.

Figure 17:
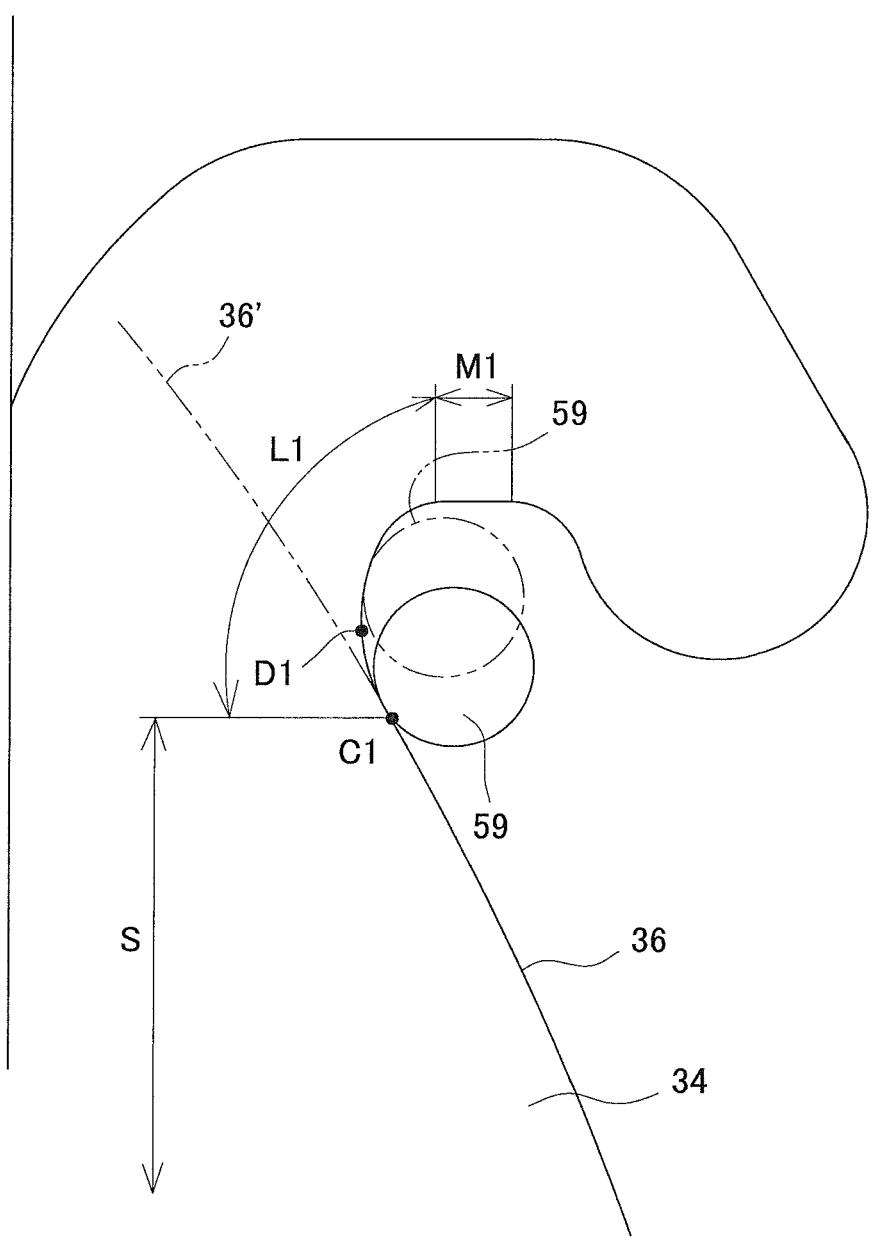
FIG. 17 is a partially enlarged view showing an area around an upper end of a fixed cam surface.

FIG. 17 is an enlarged view of an area around the upper end of the fixed cam surface 36 of the fixed cam member 34 shown in the left section of the diagram. In the diagram, a contact point of the second cam follower 59 with the fixed cam surface 36, indicated by solid line, is an upper-limit position C1 of an effective region S of the fixed cam surface where the function of causing the support frame section 23 on which the article B is mounted to stop at a desired height position is demonstrated. The fixed cam surface 36 further extends upward from the upper-limit position C1, and an upper cushioning area L1 and an upper stopper area M1 are successively provided.

The upper cushioning area L1 is significantly curved in a direction opposite to a virtual fixed cam surface extension section 36' indicated by imaginary line in the diagram. The upper cushioning area L1 is curved in such a way as to pass through a point D1, where the tangential direction thereof is vertical, on the way to the upper stopper area M1. The upper stopper area M1 is a horizontal surface that faces downward to completely stop the upward movement of the second cam follower 59.

In the upper cushioning area L1, from the upper-limit position C1 to the point D1, the slope of the tangential direction relative to the vertical direction becomes rapidly smaller. Accordingly, an upward vertical component of the reaction force applied from the fixed cam surface 36 to the second cam follower 59 rapidly decreases, and drops to zero at point D1. As a result, the assist force added from the fixed cam surface 36 to the biasing force FA of the first spring 24 is rapidly lost, significantly slowing the upward movement of the article B and the support frame section 23.

In the range extending from the point D1 to the upper stopper area M1, the reaction force applied from the fixed cam surface 36 to the second cam follower 59 generates a downward vertical component, thereby pushing down the second cam follower 59. As a result, the upward movement of the article B and the support frame section 23 is further slowed down.

Due to such a downward deceleration action, the guide frames 38 and 39 of the support frame section 23 do not collide with the upper end of the guide rail 31 of the fixed frame section 22, and the second cam follower 59 is stopped in the upper cushioning area L1. Even if the second cam follower 59 is not stopped, the second cam follower 59 enters the upper stopper area M1 at a relatively low speed before being stopped there. At this stop position, the weight of the article B and the support frame section 23 combined is greater than the push-up force of the first spring 24. Therefore, after being stopped very temporarily, the article B and the support frame section 23 start gradually and slightly going down due to their own weight, and the second cam follower 59 is stopped after returning to an area near the upper-limit position C1.

Figure 18:
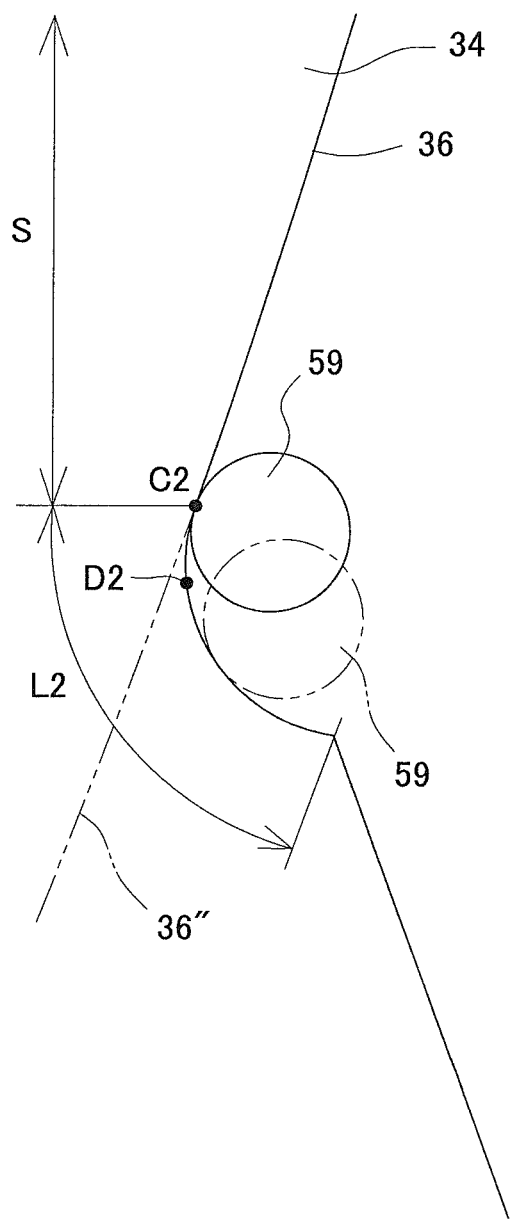
FIG. 18 is a partially enlarged view showing an area around a lower end of a fixed cam surface.

FIG. 18 is an enlarged view of an area around the lower end of the fixed cam surface 36. In the diagram, a contact point of the second cam follower 59 with the fixed cam surface 36, indicated by solid line, is a lower-limit position C2 of the effective region S of the fixed cam surface. The fixed cam surface 36 further extends downward from the lower-limit position C2, and a lower cushioning area L2 is provided.

The lower cushioning area L2 is significantly curved in a direction opposite to a virtual fixed cam surface extension section 36" indicated by imaginary line in the diagram. The middle of the lower cushioning area L2 is further curved after passing through a point D2, where the tangential direction thereof is vertical. From the lower-limit position C2 to D2, the slope of the tangential direction relative to the vertical direction becomes rapidly smaller. Accordingly, a downward vertical component of the reaction force applied from the fixed cam surface 36 to the second cam follower 59 rapidly decreases, and drops to zero at point D2. As a result, the force of pushing down the support frame section 23 against the biasing force of the first spring 24 is rapidly lost, significantly slowing the downward movement of the article B and the support frame section.

In the range beyond the point D2, the reaction force applied from the fixed cam surface 36 to the second cam follower 59 generates an upward vertical component, thereby pushing up the second cam follower 59. As a result, the downward movement of the article B and the support frame section 23 is further slowed down.

Due to such an upward deceleration action, the guide frames 38 and 39 of the support frame section 23 do not collide with the lower end of the guide rail 31 of the fixed frame section 22, and the second cam follower 59 is stopped in the lower cushioning area L2. At this stop position, the push-up force of the first spring 24 is greater than the weight of the article B and the support frame section 23 combined. Therefore, after being stopped very temporarily, the article B and the support frame section 23 go up slightly due to the biasing force of the first spring, and the second cam follower 59 is stopped after returning to an area near the lower-limit position C2 of the fixed cam surface 36.

FIGS. 17 and 18 only show the fixed cam member 34, which is shown in the left sections of the diagrams. In the right fixed cam member 35, the upper cushioning area L1, the upper stopper area M1, and the lower cushioning area L2 may be similarly provided. Needless to say, those areas may be provided in either the fixed cam member 34 or 35. Moreover, either a set of the upper cushioning area L1 and upper stopper area M1 or the lower cushioning area L2 may be provided.

According to the present embodiment, in order to slow and/or stop the support frame section 23 at the upper and lower ends of the up-down stroke, the fixed cam surface 36 is extended above and below the effective region S, and the cushioning areas in which the forces acting around the cam follower member 55 will not be balanced are provided. According to another embodiment, a region in which the forces acting around the cam follower member 55 will not be balanced may be provided between regions where the forces acting around the cam follower member will be balanced, or may be provided within the effective region S of the fixed cam surface 36.

For example, in the first region S1 of the fixed cam surface 36, a non-equilibrium region with a slope that reduces the upward assist force more than an equilibrium state, and a non-equilibrium region with a slope that brings the assist force back to the original level, may be successively provided between an equilibrium region and an equilibrium region. In the third region S3 of the fixed cam surface 36, a non-equilibrium region with a slope that reduces a downward force of reducing the biasing force of the spring more than an equilibrium state, and a non-equilibrium region with a slope that brings that force back to the original level, may be successively provided between an equilibrium region and an equilibrium region.

In such a case, the moving support frame section 23 would cause a temporary change in the traveling speed and suffer a mild shock associated with the change, as the support frame section 23 gets into a non-equilibrium region from an equilibrium region and goes back to the equilibrium region. Therefore, a user who is manually operating the handle lever 67 of the operation handle section 25 can recognize the height position of the moving support frame section 23.

In a non-equilibrium region, the forces acting around the cam follower member 55 are balanced against each other at a position where the direction of the slope is changed. Therefore, if this position is preset, the support frame section 23 can be easily stopped at a desired height position. Such a height position may be a middle position of the up-down stroke of the support frame section 23, for example.

According to the above-described embodiment of FIGS. 1 to 6, the cam grooves 13, 48, and 49 are provided in such a way as to horizontally extend on the lateral frame member 10b or the lower frame 42. According to another embodiment, depending on the structure and purpose of the support mechanism, design conditions, and the like, the cam grooves 13, 48, and 49 may be provided diagonally, or may be provided in a cross direction that is not perpendicular to the movement direction of the movable support section or support frame section.

The first movable cam surface and the second movable cam surface in the cam groove 13, 48, or 49 may not be provided in parallel. All that is required is for the first movable cam surface and the second movable cam surface to be disposed in such a way as to face each other, with one of the movable cam surfaces coming in contact with the cam follower member to make it possible to transmit the load and the spring force of the first spring therebetween.

Furthermore, the article support device 20 of the present embodiment includes the brake mechanism that can keep the support frame section 23 at a desired height position even when an external force, such as vibration or shock, is applied, and can easily move or stop the support frame section 23 through a simple operation. The brake mechanism includes the brake device 45 of the support frame section 23 and the first brake rail 31 of the fixed frame section 22. As the handle lever 67 of the operation handle section 25 is operated, the brake device 45 is activated via the transmission rods 65 or is released.

Figure 19:
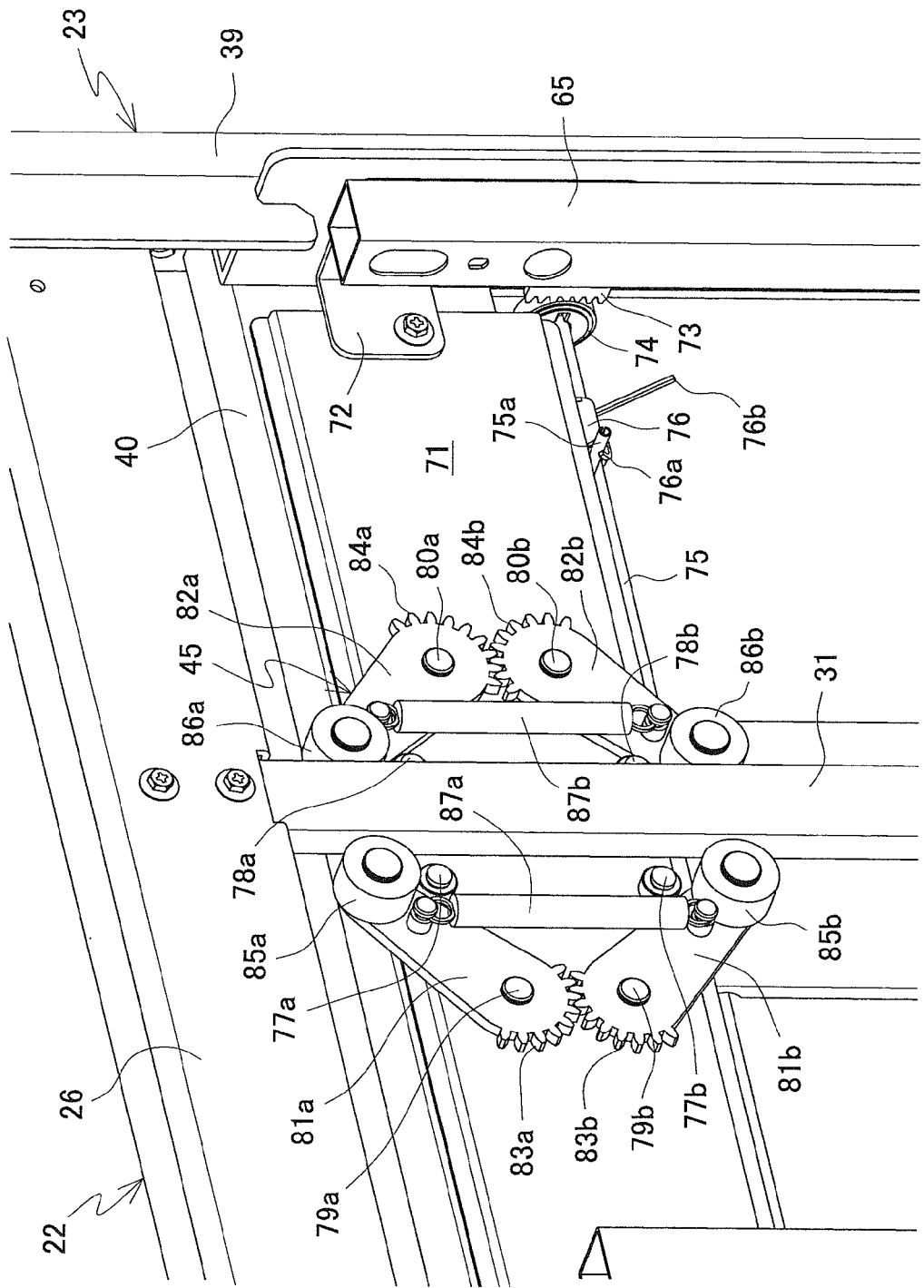
FIG. 19 is a partially enlarged perspective view showing a brake mechanism of a first embodiment.

As shown in FIG. 19, the brake device 45 is disposed just ahead of the upper frame 40 of the support frame section 23 in such a way as to be slightly separated therefrom and run parallel to the upper frame 40; and is disposed right behind the first brake rail 31 of the fixed support frame section 22. The brake device 45 includes a transmission plate 71 that extends in the left-right direction. The left and right end portions of the transmission plate 71 is mounted integrally and fixed to the upper end portions of the left and right transmission rods 65 via appropriate stays 72, for example.

The transmission rods 65 are mounted in such a way as to be able to move up and down relative to the left and right guide frames 38 and 39 of the adjacent support frame section 23 within a predetermined small range. More specifically, the transmission rods 65 and the transmission plate 71 can move up and down between a home position shown in FIG. 20, an upward release position shown in FIG. 21, and a downward release position shown in FIG. 22.

On at least one transmission rod 65, a rack 73 is provided integrally; a pinion 74, which meshes with the rack, is mounted integrally and coaxially with a spring shaft 75, which is horizontally stretched between the two guide frames and is provided in the axis direction and in a rotatable manner. Around the spring shaft 75, a return spring 76, which is a coil spring for example, is gently wound, and is used to push up the transmission rod 65 via the pinion 74 and the rack 73. One end 76a of the return spring 76 is fastened to a claw 75a on the spring shaft 75 in a direction in which the transmission rod 65 is pressed upward. The other end 76b is provided in such a way as to be freely engaged with or detached from an engagement portion (not shown) of the guide frame depending on a rotation position of the spring shaft 75.

Figure 20:
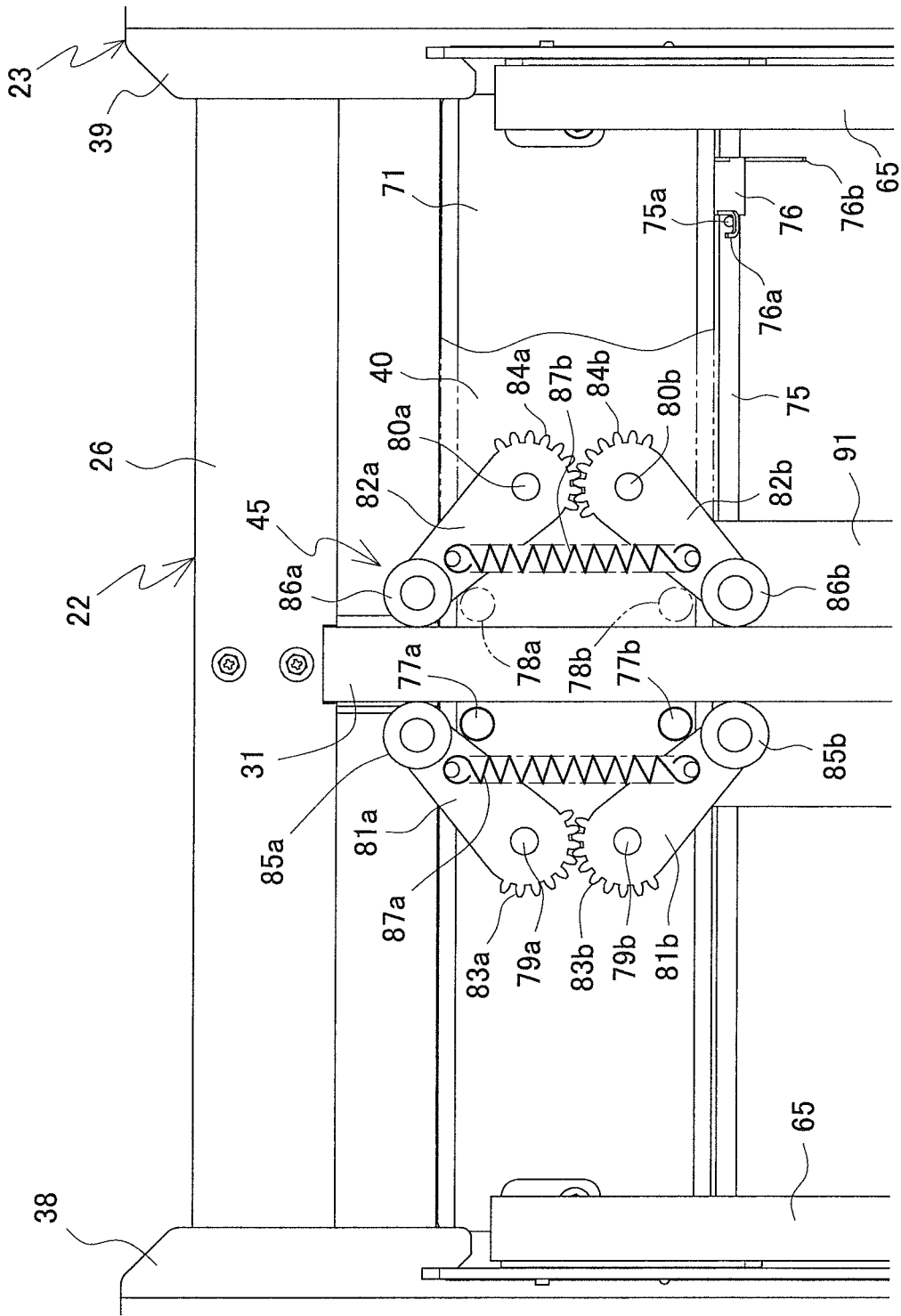
FIG. 20 is a front view of a brake mechanism of FIG. 19.

At the home position shown in FIG. 20, the other end 76b of the return spring 76 engages with the engagement portion and presses the transmission rod 65 and the transmission plate 71 upward. When the operation handle section 25 is manually pushed down to move the transmission rod and the transmission plate from the home position to the downward release position of FIG. 22, the other end 76b of the return spring 76 still remains engaged with the engagement portion. After that, once a user gets his/her hands off the operation handle section, the transmission rod and the transmission plate start to move upward due to the biasing force of the return spring 76 and return to the home position.

Figure 21:
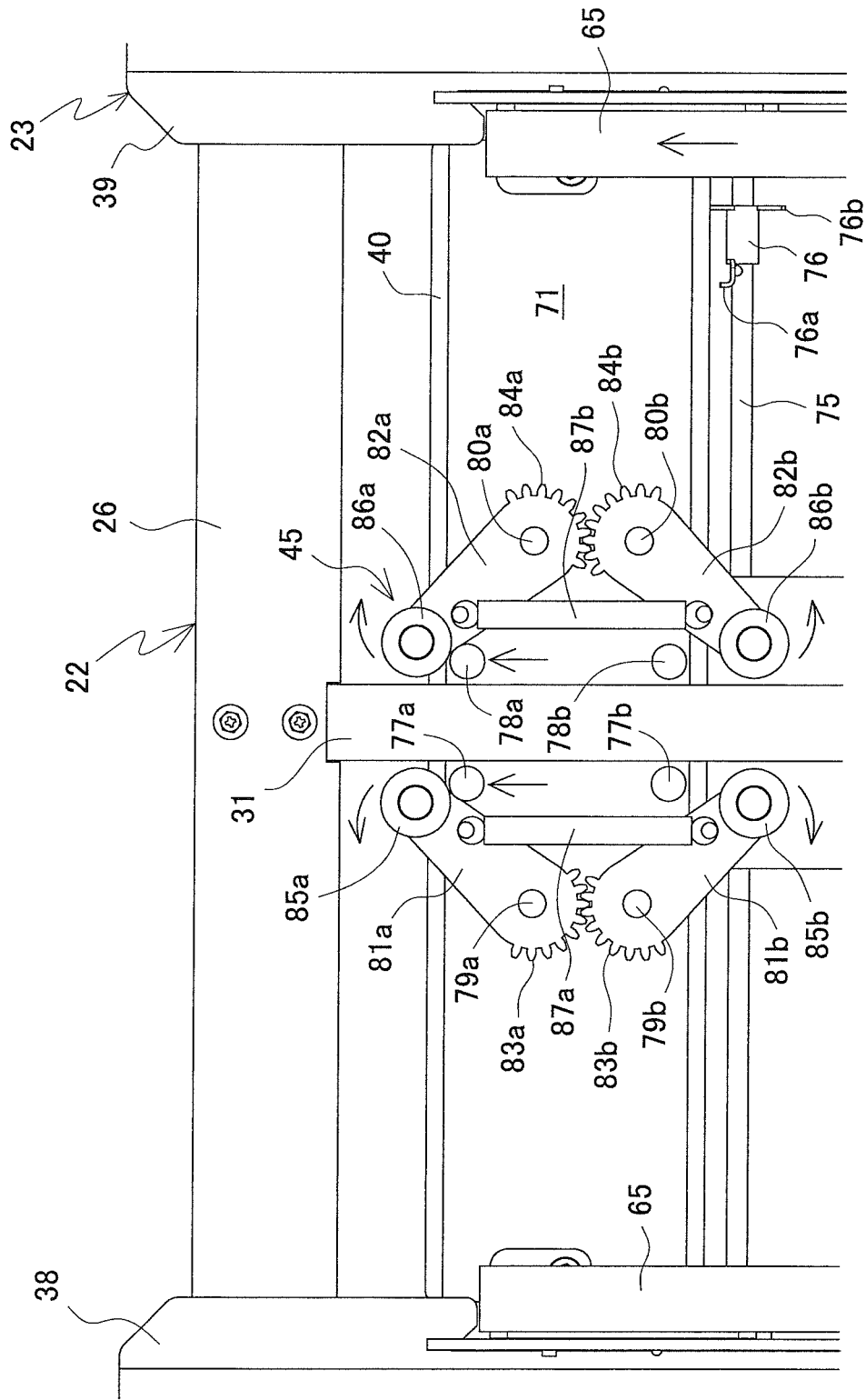
FIG. 21 is a front view showing a moving-up release operation of a brake mechanism.

When the operation handle section 25 is manually pushed up to move the transmission rod and the transmission plate from the home position to the upward release position of FIG. 21, the other end 76b of the return spring 76 is released from the engagement portion, and the biasing force of the return spring is lost. After that, once a user gets his/her hands off the operation handle, the transmission rod and the transmission plate go down due to their own weight and return to and stop at the home position where the biasing force of the return spring is restored.

On the transmission plate 71, on the left and right sides of the first brake rail 31, pairs of transmission pins 77a, 77b, 78a, and 78b are provided integrally and symmetrically in the left-right direction in such a way as to protrude forward. The transmission pins 77a, 77b, 78a, and 78b are disposed just outside of the first brake rail 31 in such a way that the pairs are separated from each other in the up-down direction with a certain distance therebetween.

On the upper frame 40 of the support frame section 23, pairs of support shafts 79a, 79b, 80a, and 80b are provided on both sides of the first brake rail 31 in such a way as to be closer to the outer sides than the transmission pins; the support shafts 79a, 79b, 80a, and 80b are provided integrally and symmetrically in the left-right direction in such a way as to protrude forward. The upper support shafts 79a and 80a are disposed below the upper transmission pins 77a and 78a. The lower support shafts 79b and 80b are disposed above the lower transmission pins 77b and 78b. The tip of each support shaft is inserted into a release hole (not shown) that is made in the transmission plate 71, and extends from the front side of the transmission plate. The release holes of the transmission plate 71 are large enough not to obstruct the up-down movement of the transmission plate when the operation handle section 25 is operated as described above.

On the tips of the support shafts 79a, 79b, 80a, and 80b that protrude from the front side of the transmission plate 71, brake arms 81a, 81b, 82a, and 82b are pivotally mounted in a rotatable manner along a plane of the transmission plate 71, respectively. The upper brake arms 81a and 82a are disposed above the upper transmission pins 77a and 78a, which are adjacent to the tip portions of the upper brake arms 81a and 82a. The lower brake arms 81a and 82b are disposed below the lower transmission pins 77b and 78b, which are adjacent to the tip portions of the lower brake arms 81a and 82b.

On base end portions of the brake arms, gear sections 83a, 83b, 84a, and 84b are formed on the outer peripheries of the brake arms. The gear sections of the brake arms 81a and 81b that are paired in the up-down direction mesh with one another, and the gear sections of the brake arms 82a and 82b that are paired in the up-down direction mesh with one another. Therefore, in each pair of brake arms, as one is rotated, the other starts to rotate in the opposite direction.

On the tips of the brake arms, brake shoes 85a, 85b, 86a, and 86b are provided. Between the tip portions of the brake arms 81a and 81b and 82a and 82b that are paired in the up-down direction, extension springs 87a and 87b are placed to press the brake arms toward each other. Due to the biasing force of the extension springs 87*a* and 87*b*, each of the brake shoes is pressed against the side surface of the first brake rail 31 at the home position of FIG. 20. The spring strength of each extension spring is set in such a way as to exert frictional resistance or braking force strong enough to make it difficult for the support frame section 23 on which the article B is mounted to move from the stationary position, between the brake shoes and the side surfaces of the first brake rail 31.

When the operation handle section 25 is lifted up to move the transmission plate 71 to the upward release position shown in FIG. 21, the upper transmission pins 77*a* and 78*a* come in contact with side edges of the upper brake arms 81*a* and 82*a*, thereby turning the upper brake arms 81*a* and 82*a* in an upward outward direction against the biasing forces of the extension springs 87*a* and 87*b*. In response, the lower brake arms 81*b* and 82*b* are turned in the downward outward direction. As a result, the brake shoes are released from the engagement with the side surfaces of the first brake rail 31, allowing a user to keep pushing up the operation handle section 25 and freely move the support frame section 23 upward.

Figure 22:
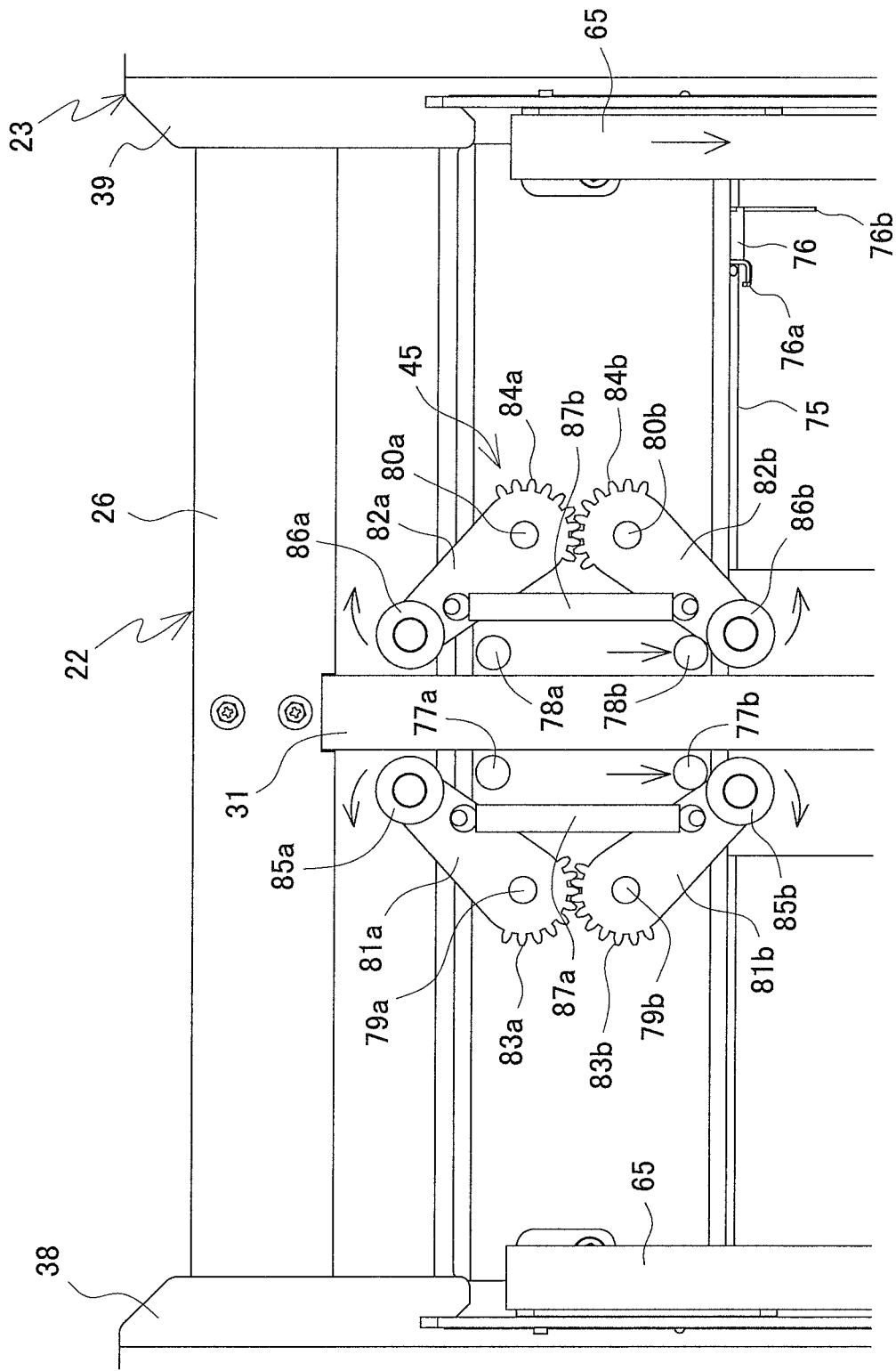
FIG. 22 is a front view showing a moving-down release operation of a brake mechanism.

When the operation handle section 25 is pulled down to move the transmission plate 71 to the lower release position shown in FIG. 22, the lower transmission pins 77*b* and 78*b* come in contact with side edges of the lower brake arms 81*b* and 82*b*, thereby turning the lower brake arms 81*b* and 82*b* in a downward outward direction against the biasing forces of the extension springs 87*a* and 87*b*. In response, the upper brake arms 81*a* and 82*a* are turned in an upward outward direction. As a result, the brake shoes are released from the engagement with the side surfaces of the first brake rail 31, allowing a user to continue pushing down the operation handle section 25 and freely move the support frame section 23 downward.

The support frame section 23 can be lifted up or down with a relatively small force. If a user operates the operation handle section 25 with a strong force by accident, the operation handle section 25 might move so fast that the operation handle section 25 cannot be stopped at a desired position, or that a sufficient deceleration cushioning effect cannot be achieved even by the cushioning mechanism. To solve this problem, the article support device 20 of the present embodiment further includes a speed limiter mechanism to curb or limit the movement speed of the support frame section 23.

Figure 23:
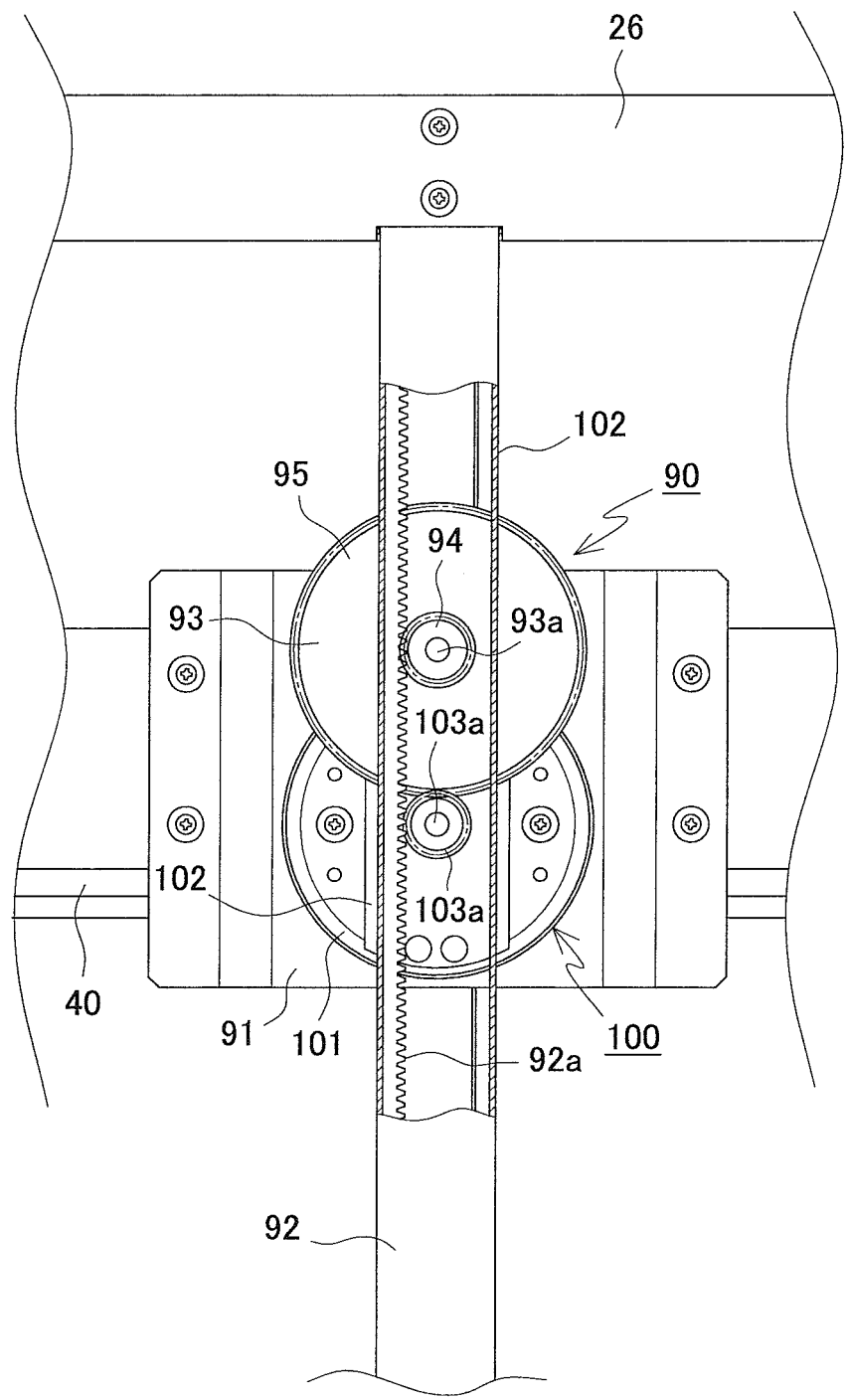
FIG. 23 is a partially crushed enlarged view of a speed limiter mechanism as seen from a back side of an article support device.

As shown in FIG. 23, a speed limiter mechanism 90 of the present embodiment includes a centrifugal brake device 100, which is provided in the support frame section 23; and a second brake rail 92, which is provided in the fixed frame section 22. The second brake rail 92 is disposed on the rear side of the first brake rail 31 of the fixed frame section, and extends vertically downward from the center of the upper frame 26, and is long enough to sufficiently cover the up-down stroke of the support frame section. The second brake rail 92 is U-shaped in cross-section in such a way as to be open to the front side. On one internal surface thereof, a rack 92*a*, which extends in the vertical direction, is formed integrally.

The centrifugal brake device 100 is disposed between a center plate 91, which is fixed to the center of the back surface of the upper frame 40 of the support frame section 23, and the second brake rail 92. The centrifugal brake device 100 includes a circular frame 101, which is fixed to the back surface of the center plate 91; and a rotation plate 102, which is supported within the circular frame in such a way as to freely rotate around a center shaft 103*a* thereof. The rotation plate 102 includes a pair of parallel long sides and a pair of arc-shaped short sides. At the center thereof, a small gear 103 is provided integrally and concentrically with the center shaft 103*a* of the circular frame.

As shown in FIG. 24A, on one of the short sides of the rotation plate 102, a pair of brake arms 104*a* and 104*b* is attached; at base end portions of the brake arms 104*a* and 104*b*, the brake arms 104*a* and 104*b* can swing around support shafts 105*a* and 105*b*, and are mounted symmetrically in the left-right direction with respect to the longitudinal direction of the rotation plate. The brake arms 104*a* and 104*b* each have a semicircular arc shape, and are bent in such a way as to extend along the inner peripheral surface of the circular frame 101. An extension spring 107, which is provided between the brake arms 104*a* and 104*b*, presses the brake arms 104*a* and 104*b* toward each other. Pins 109*a* and 109*b* are provided at free ends of the brake arms 104*a* and 104*b* in such a way as to protrude; the pins 109*a* and 109*b* are inserted into long holes 108*a* and 108*b*, which are formed in the rotation plate 102. The long holes 108*a* and 108*b* limit the swingable range.

On the brake arms 104*a* and 104*b*, brake shoes 106*a* and 106*b* are mounted in such a way that at least portions of the brake shoes 106*a* and 106*b* protrude from the outer peripheral edges of the brake arms toward the inner peripheral surface of the circular frame 101. The brake shoes 106*a* and 106*b* are disposed in such a way as to be not in contact with the inner peripheral surface of the circular frame 101 as shown in FIG. 24A at a time when the centrifugal brake device 100 is not working, or to be engaged with the inner peripheral surface of the circular frame as shown in FIG. 24B at a time when the centrifugal brake device is working.

As shown in FIG. 23, between the centrifugal brake device 100 and the second brake rail 92, a gear member 93 is provided in such a way as to freely rotate around a central shaft 93*b*, which is fixed to the center plate 91. The gear member 93 includes a pinion 94, which is a small gear provided concentrically with the central shaft 93*b*, and a large gear 95, which is provided along the outer periphery. The gear member 93 is mounted in such a way that the pinion 94 meshes with the rack 92*a* of the second brake rail 92, and that the large gear 95 meshes with the small gear 103 of the rotation plate 102.

As the support frame section 23 is moved up or down, the gear member 93 is rotated by the rack 92*a* and the pinion 94. As a result, the rotation plate 102 starts to rotate at high speeds depending on the gear ratio of the large gear 95 and the small gear 103. The rotation speed of the rotation plate 102 increases or decreases depending on the speed at which the support frame section 23 is moved up or down.

When the support frame section 23 is stationary or is moving at a very slow speed, the brake arms 104*a* and 104*b* of the centrifugal brake device 100 do not swing at all from the position shown in FIG. 24A due to the biasing force of the extension spring 107. Therefore, the brake shoes do not come in contact with the inner peripheral surface of the circular frame 101. As a result, the support frame section 23 can continue to move at slow speed.

As the movement speed of the support frame section 23 becomes faster, the brake arms 104*a* and 104*b* start to move away against the biasing force of the extension spring 107. When the movement speed of the support frame section is relatively low, and when the swinging of the brake arms is small, the brake shoes similarly do not come in contact with the inner peripheral surface of the circular frame 101. Therefore, the support frame section 23 can continue to move.

After the movement speed of the support frame section 23 exceeds a certain level, the brake arms are significantly separated against the biasing force of the extension spring 107, and the brake shoes are coming in contact with the inner peripheral surface of the circular frame as shown in FIG. 24B. Therefore, the movement of the support frame section 23 is slowed down depending on the magnitude of friction between the brake shoes and the inner peripheral surface of the circular frame. After the movement of the support frame section 23 is decelerated to a certain degree, the brake arms start to come close to each other due to the extension spring 107, and the brake shoes are released from their contact with the inner peripheral surface of the circular frame. Therefore, the support frame section 23 can smoothly move at the decelerated speed.

As the movement speed of the support frame section 23 becomes even faster, the brake arms are separated to a maximum extent against the biasing force of the extension spring 107, and the brake shoes are therefore strongly pressed against the inner peripheral surface of the circular frame. As a result, the support frame section 23 is significantly decelerated and can be stopped in some cases. After the movement of the support frame section 23 is decelerated to a certain degree or stopped, the brake arms similarly start to come close to each other due to the extension spring 107, and the brake shoes are released from their contact with the inner peripheral surface of the circular frame. As a result, the support frame section 23 can smoothly move at the decelerated speed, or can move again.

In that manner, according to the present embodiment, the above speed limiter mechanism 90 curbs or limits the movement speed of the support frame section 23, thereby eliminating in advance the risk of being unable to control the moving or stopping of the support frame section through a user's careless or accidental operation. Therefore, especially in the case where a heavy object such as a large television monitor is supported, this configuration further improves safety.

While preferred embodiments of the present invention have been described, the present invention is not limited to the above embodiments. Various modifications or changes may be made within the technical scope thereof in carrying out the invention. For example, a load range in which the article support device 1 is available may be set in various ways, and the fixed cam surface may be designed accordingly in such a way as to have various cam profiles. Furthermore, as the first and second springs, apart from the above-described coil springs, springs of different shapes such as plate springs or spiral springs, fluid springs such as air springs, springs made of elastic material such as rubber, springs made of other nonmetallic material, and various other publicly-known springs may be used.

Incidentally, this application claims priority from Japanese Patent Application Nos. 2013-214255, 2013-214257, and 2014-49397, the entire contents of which are incorporated herein by reference.

What is claimed is:

1. A load support mechanism comprising:
   a fixed support section;
   a movable support section that can move in a predetermined direction relative to the fixed support section within a predetermined range and is used to receive a load;
   a fixed cam that is provided in the fixed support section and includes a fixed cam surface;
   a cam groove that is provided in the movable support section, includes a first and a second movable cam surface that face each other, and extends in a direction that crosses a movement direction of the movable support section;
   a cam follower that can move in the cam groove along the cam groove while being in contact with the first or second movable cam surface;
   a first spring that is mounted between the fixed support section and the movable support section to support the load; and
   a second spring that presses the cam follower against the fixed cam surface,
   wherein a reaction force of the fixed cam surface against the cam follower contains a first-direction component, which is generated at a position thereof in the predetermined range in which the movable support section can move and which is applied in the movement direction of the movable support section, and a second-direction component which is perpendicular to at least the movement direction of the movable support section, and
   the fixed cam surface has a cam shape by which a load acting around the cam follower, a biasing force of the first spring, the reaction force of the fixed cam surface against the cam follower, and a biasing force of the second spring are balanced in the predetermined range in which the movable support section can move.

2. The load support mechanism according to claim 1, wherein the fixed cam surface includes an equilibrium region in which forces acting around the cam follower are balanced, and a non-equilibrium region which follows the equilibrium region and in which the forces acting around the cam follower are not balanced.

3. The load support mechanism according to claim 1, wherein the fixed support section includes outer frame portions on both sides of the movement direction of the movable support section, and both side portions of the movable support section are guided by the outer frame portions in the movement direction.

4. The load support mechanism according to claim 1, wherein:
   the movable support section includes a support member that extends in a direction perpendicular to the movement direction thereof;
   the cam groove is provided on the support member; and
   the second spring is a compression coil spring that is fitted onto or into the support member to press the cam follower in a direction in which the support member extends.

5. The load support mechanism according to claim 4, wherein the cam groove extends from around one end of the support member to an opposite side, and the second spring presses the cam follower toward the one end of the support member.

6. The load support mechanism according to claim 5, wherein:
   the cam follower includes a first cam follower member, which passes through the cam groove in a front-back direction of the support member, and a pair of front and rear second cam follower members, which are provided at front and rear ends of the first cam follower member protruding from the cam groove; and the fixed cam includes a pair of front and rear fixed cam members with which each of the second cam follower members comes in contact.

7. The load support mechanism according to claim 1, wherein the first and second springs are disposed in such a way as to at least partially overlap with each other when viewed in a direction perpendicular to the movement direction of the movable support section in a planar fashion.

\* \* \* \* \*